(12) United States Patent
Onurlu et al.

(10) Patent No.: US 11,434,876 B2
(45) Date of Patent: Sep. 6, 2022

(54) MOVEMENT AND POSITIONING ADAPTOR FOR HANDLING ROOT-RING OF WIND TURBINE BLADE

(71) Applicant: TPI Composites, Inc., Warren, RI (US)

(72) Inventors: Özer Onurlu, Izmir (TR); Furkan Ünal, Izmir (TR)

(73) Assignee: TPI Composites, Inc., Warren, RI (US)

( * ) Notice: Subject to any disclaimer, the term of this patent is extended or adjusted under 35 U.S.C. 154(b) by 43 days.

(21) Appl. No.: 16/926,345

(22) Filed: Jul. 10, 2020

(65) Prior Publication Data

US 2021/0010461 A1 Jan. 14, 2021

Related U.S. Application Data

(60) Provisional application No. 62/873,608, filed on Jul. 12, 2019.

(51) Int. Cl.
*F03D 13/40* (2016.01)
*B66F 9/12* (2006.01)

(52) U.S. Cl.
CPC .............. *F03D 13/40* (2016.05); *B66F 9/12* (2013.01)

(58) Field of Classification Search
CPC .......... F03D 13/40; F03D 13/00; F03D 13/10; B66F 9/12; B66F 9/125; B66F 9/185
See application file for complete search history.

(56) References Cited

U.S. PATENT DOCUMENTS

| | | | | |
|---|---|---|---|---|
| 4,422,684 A | * | 12/1983 | Zitzman | B66F 9/185 294/97 |
| 9,144,863 B2 | * | 9/2015 | Pedersen | B25B 11/00 |
| 9,260,875 B2 | * | 2/2016 | Bjoernskov | B66C 1/108 |
| 10,138,649 B2 | * | 11/2018 | Pedersen | E04H 12/185 |
| 10,208,498 B2 | * | 2/2019 | Pedersen | E04H 12/342 |
| 10,697,437 B1 | * | 6/2020 | Alvarez | A47B 81/005 |
| 10,752,154 B2 | * | 8/2020 | Keller | F03D 13/40 |
| 2011/0176904 A1 | * | 7/2011 | Stiesdal | F03D 13/40 414/800 |
| 2013/0209263 A1 | * | 8/2013 | Feigl | F01D 5/14 416/223 R |
| 2017/0175715 A1 | * | 6/2017 | Karesangannavar | F03D 13/20 |
| 2017/0218915 A1 | * | 8/2017 | Wilmot | F03D 1/0691 |
| 2021/0010461 A1 | * | 1/2021 | Onurlu | F03D 13/40 |
| 2021/0095643 A1 | * | 4/2021 | Sotos Richard | F03D 13/10 |
| 2021/0299820 A1 | * | 9/2021 | Velazquez | B25B 5/06 |

FOREIGN PATENT DOCUMENTS

| | | | | |
|---|---|---|---|---|
| CN | 202138997 U | * | 2/2012 | |
| WO | WO-2019/096624 A1 | | 5/2019 | |
| WO | WO-2019096624 A1 | * | 5/2019 | F03D 13/10 |

OTHER PUBLICATIONS

International Search Report and Written Opinion for International Application No. PCT/US2020/041675 dated Sep. 30, 2020.

* cited by examiner

*Primary Examiner* — Michael A Riegelman
(74) *Attorney, Agent, or Firm* — Stephen J. Kenny; Vincenzo DiMonaco; Foley Hoag LLP

(57) ABSTRACT

A method of handling a wind turbine blade comprising: providing a forklift adaptor, the forklift adaptor including a base and an endwall, coupling the base of the forklift adaptor to at least one tine of a forklift placing a root handling apparatus within a root ring of a wind turbine blade, the root handling apparatus including a plurality of struts and at least one tension rod, and actuating the at least one tension rod to engage a surface of the root ring.

20 Claims, 29 Drawing Sheets

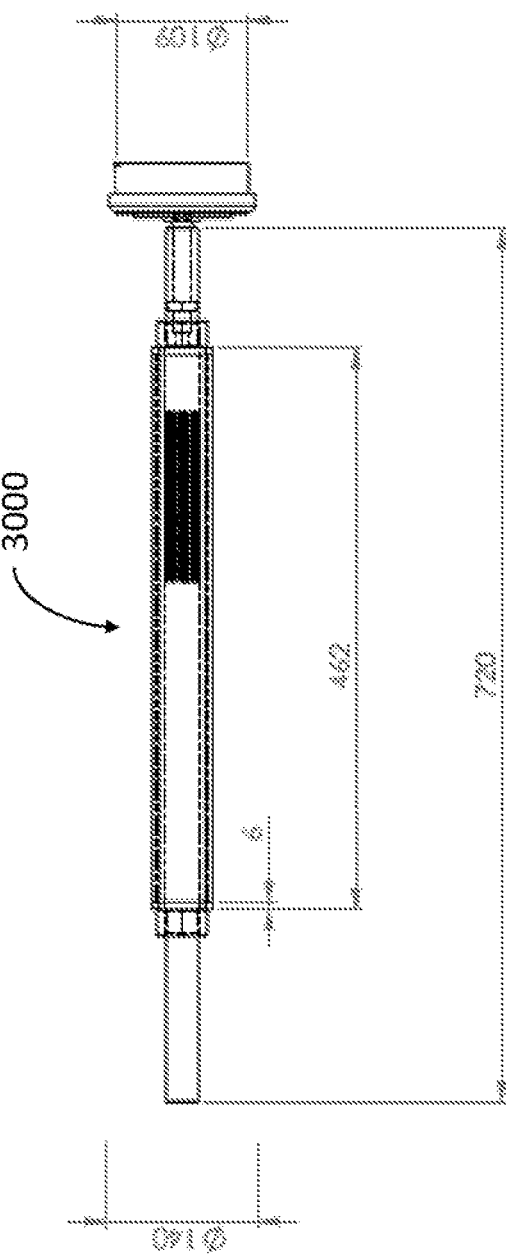
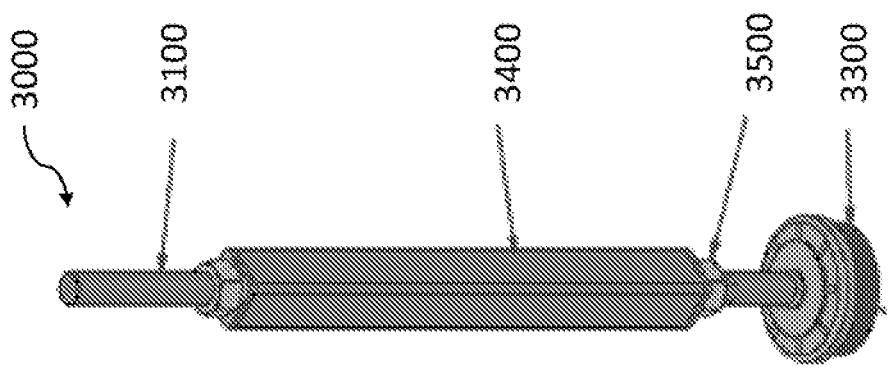
FIG. 16A
FIG. 16B

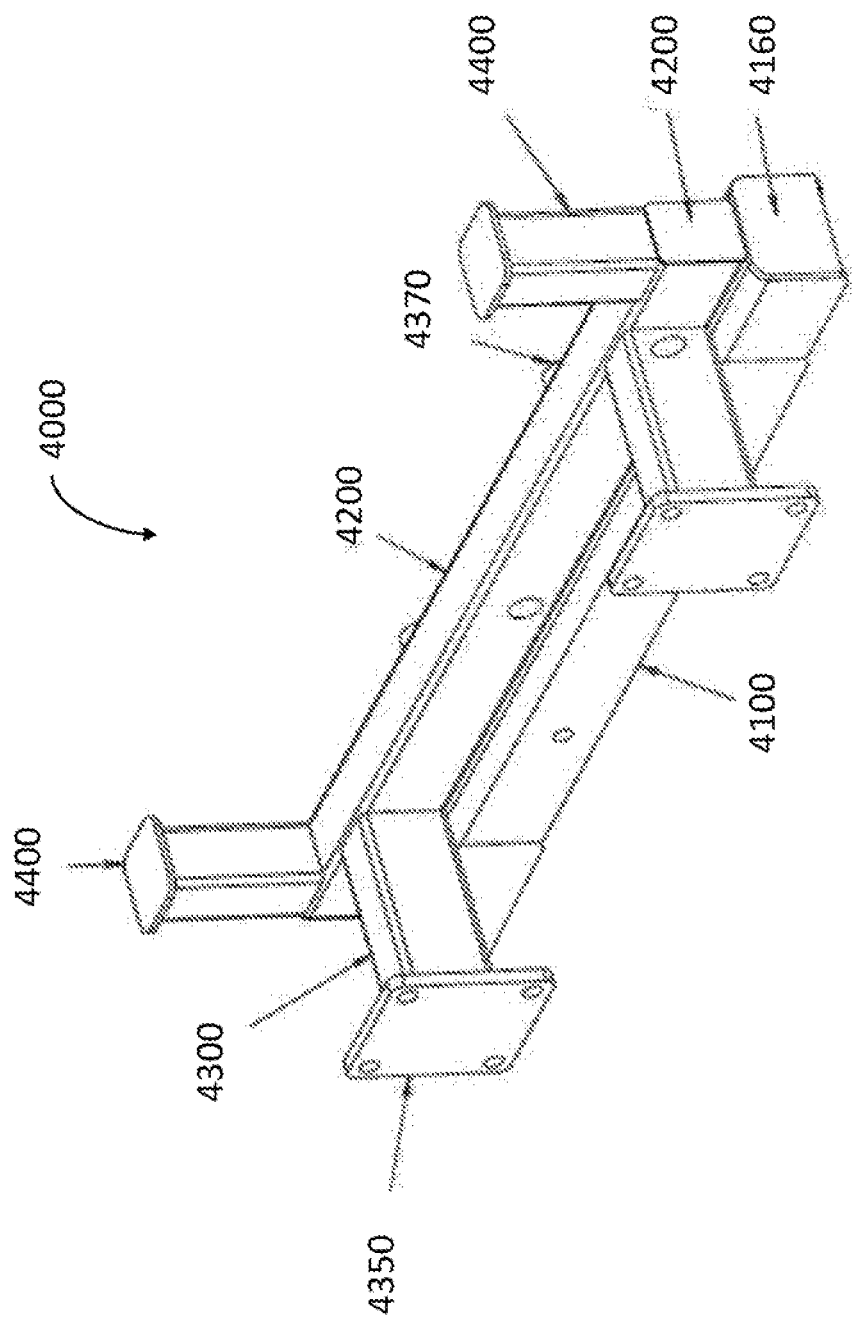

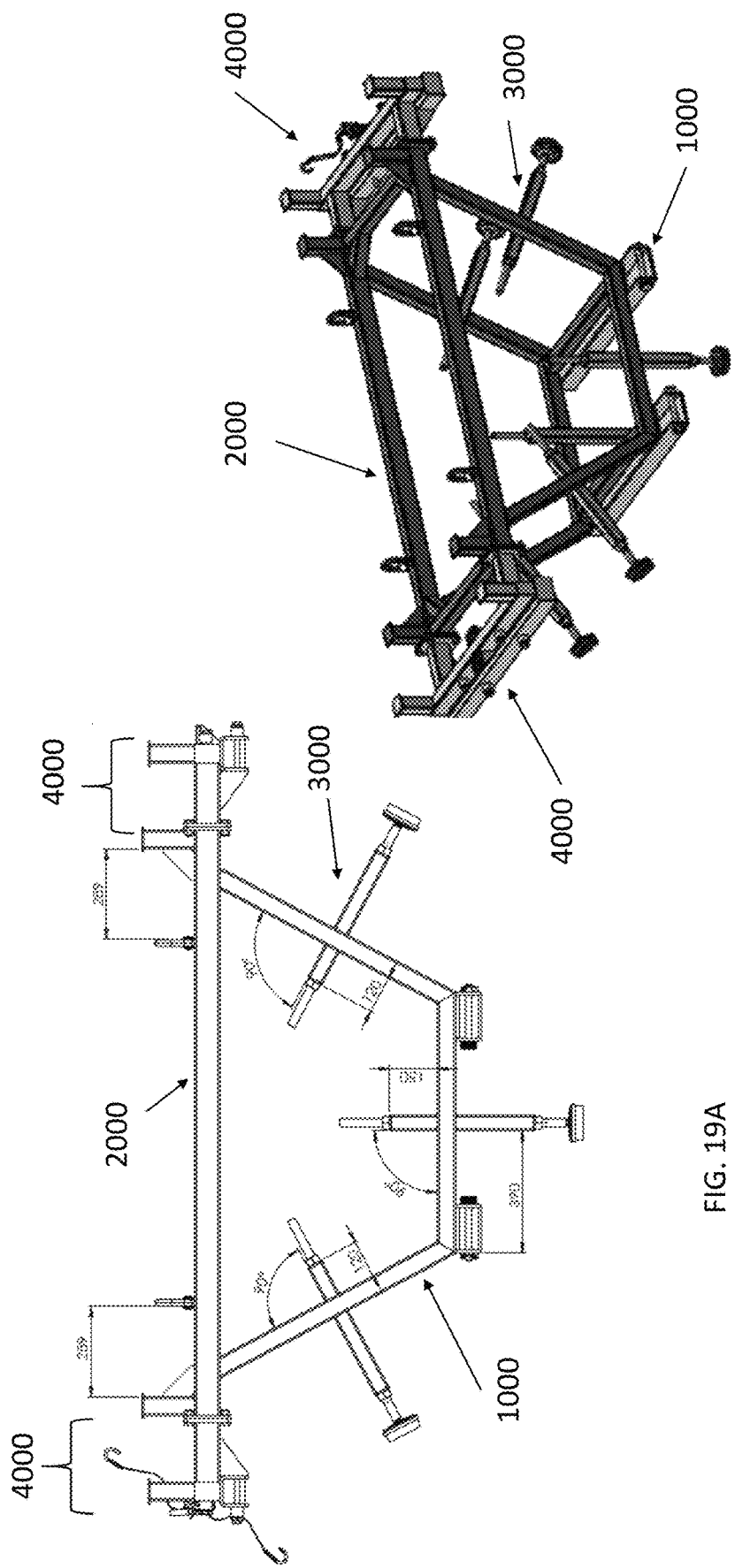

MOVEMENT AND POSITIONING ADAPTOR FOR HANDLING ROOT-RING OF WIND TURBINE BLADE

CROSS-REFERENCE TO RELATED APPLICATIONS

This application claims the benefit of priority under 35 USC 119 to U.S. Provisional Application No. 62/873,608, filed Jul. 12, 2019, the entire contents of which are hereby incorporated by reference.

BACKGROUND OF THE DISCLOSED SUBJECT MATTER

Field of the Disclosed Subject Matter

The disclosed subject matter relates to a wind turbine rotor blade handling system and apparatus for moving a wind turbine rotor blade, and a corresponding method of operating such a handling system. Particularly, the present disclosure provides a structure for handling the root-ring portion of a wind turbine blade.

Description of Related Art

A variety of methods and systems are known for use in the manufacturing process of wind turbine blades, including carts and/or cranes acting to support a section of the wind turbine blade, e.g. after removal from the blade mold, and during post molding operations (e.g. external blade surface grinding or coating operations).

Conventional blade carts comprise an enclosed ring structure which is fitted around the body of the blade. However, as blade dimensions increase, these carts are often difficult to mount to the blade. Often times a crane is required to support the blade weight while the cart is moved (often manually) along the blade. In addition, the cart presents a hazard during post molding operations where people and equipment are hindered by the large ring, and prevented from easily accessing the blade leading and trailing edges at the location of the cart.

Conventional blade carts are configured with closed brackets forming a closed ring (external to the blade) into which the wind turbine blade is introduced. The drawback of this configuration lies in the operation of loading the blade into the cart since to perform the loading step either the cart must be moved from the tip of the blade to the position of the blade where the cart can support the blade weight (e.g. the blades center of gravity), or the blade must be moved into the cart by means of using an overhead travelling crane and cables. In addition to the undesirable complexity of such conventional blade handling systems, operation of these conventional systems require a variety of movements which present high risk of blade damage when introducing and removing the various components.

Also, conventional blade handling apparatus required hawsers having one end connected to the semi-root part of the blade, and on the other end connected to the hook of the crane in order to rotate the root. During this process, the risk of the root part slipping off the hawsers was very high, presenting life-threatening hazard for the operators. In addition, there was a risk of the part falling to the ground and serious damage to the part when the piece was rotated by hawsers. Since the rotating of the root with hawsers was a cumbersome job, there was significant time lost during the operation, increasing production cycle time.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a wind turbine blade apparatus comprising: a wind turbine blade handling system comprising: a forklift adaptor, the forklift adaptor including a base and an endwall, the base configured to engage at least one tine of a forklift; a root handling apparatus, the root handling apparatus including a plurality of struts; at least one tension rod, the at least one tension rod coupled to the at least one strut; wherein at least a portion of the root handling apparatus and at least one tension rod is configured to be disposed within a root ring.

In some embodiments, the root handling apparatus root ring are coupled together.

In some embodiments, the root handling apparatus root ring are elevated together.

In some embodiments, the root handling apparatus root ring are rotated together.

In some embodiments, the tension rod includes an actuator on a first end and a dampening shoe on a second end thereof.

In some embodiments, the dampening shoe includes a shape complimentary to the shape of the root ring.

In some embodiments, a plurality of tension rods are selectively actuatable to engage an interior surface of the root ring.

In some embodiments, the at least one tension rod applies a force to the root ring.

In some embodiments, the root handling apparatus and tension rod are separate components.

In some embodiments, the root handling apparatus and root ring are rotatable 360 degrees about a longitudinal axis.

In some embodiments, the root handling apparatus has a first end and a second end, at least one end having a length equal to or greater than the diameter of the root ring.

In accordance with another aspect of the disclosure, a method of handling a wind turbine blade is included which comprises: providing a forklift adaptor, the forklift adaptor including a base and an endwall, coupling the base of the forklift adaptor to at least one tine of a forklift; placing a root handling apparatus within a root ring of a wind turbine blade, the root handling apparatus including a plurality of struts and at least one tension rod, and actuating the at least one tension rod to engage a surface of the root ring.

In some embodiments, the method further comprises coupling at least one side of the root handling apparatus to the root ring.

In some embodiments, coupling includes connecting a mechanical fastener between the root handling apparatus and the root ring.

In some embodiments, the method further comprises elevating the root handling apparatus and root ring simultaneously.

In some embodiments, elevating includes attaching a cable to the root handling apparatus.

In some embodiments, the method comprises rotating the root handling apparatus and root ring simultaneously.

In some embodiments, actuating the at least one tension rod includes elongating the at least one tension rod to apply a tensile force on the root ring.

In some embodiments, the at least one tension rod includes a plurality of tension rods, with each tension rod actuated independently.

In some embodiments, at least two tension rods are elongated to different lengths.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 16A-B depicts an isolated cross sectional and perspective views of the forklift adapter of the embodiment shown in FIG. 11.

FIGS. 17A-D depict perspective, front, top and cross sectional views of the root ring attachment of the embodiment shown in FIG. 11.

FIGS. 19A-B depict perspective, and perspective views of the root handling apparatus and root ring attachment of the embodiment shown in FIG. 11.

DETAILED DESCRIPTION OF AN EXEMPLARY EMBODIMENT

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

Reference will now be made in detail to exemplary embodiments of the disclosed subject matter, examples of which are illustrated in the accompanying drawings. The method and corresponding steps of the disclosed subject matter will be described in conjunction with the detailed description of the system.

The methods and systems presented herein may be used for handling, e.g. clamping, securing, lifting, rotating and transporting a wind turbine blade (or portion(s) thereof). In an exemplary embodiment, this system consists of an apparatus particularly suited for handling a root ring of a wind turbine blade, which in some embodiments, can be fabricated as a separate/discrete component with respect to the remainder of the blade. The system and apparatus disclosed herein can be used to facilitate various finishing processes of the wind turbine blade manufacturing.

Figure 1:
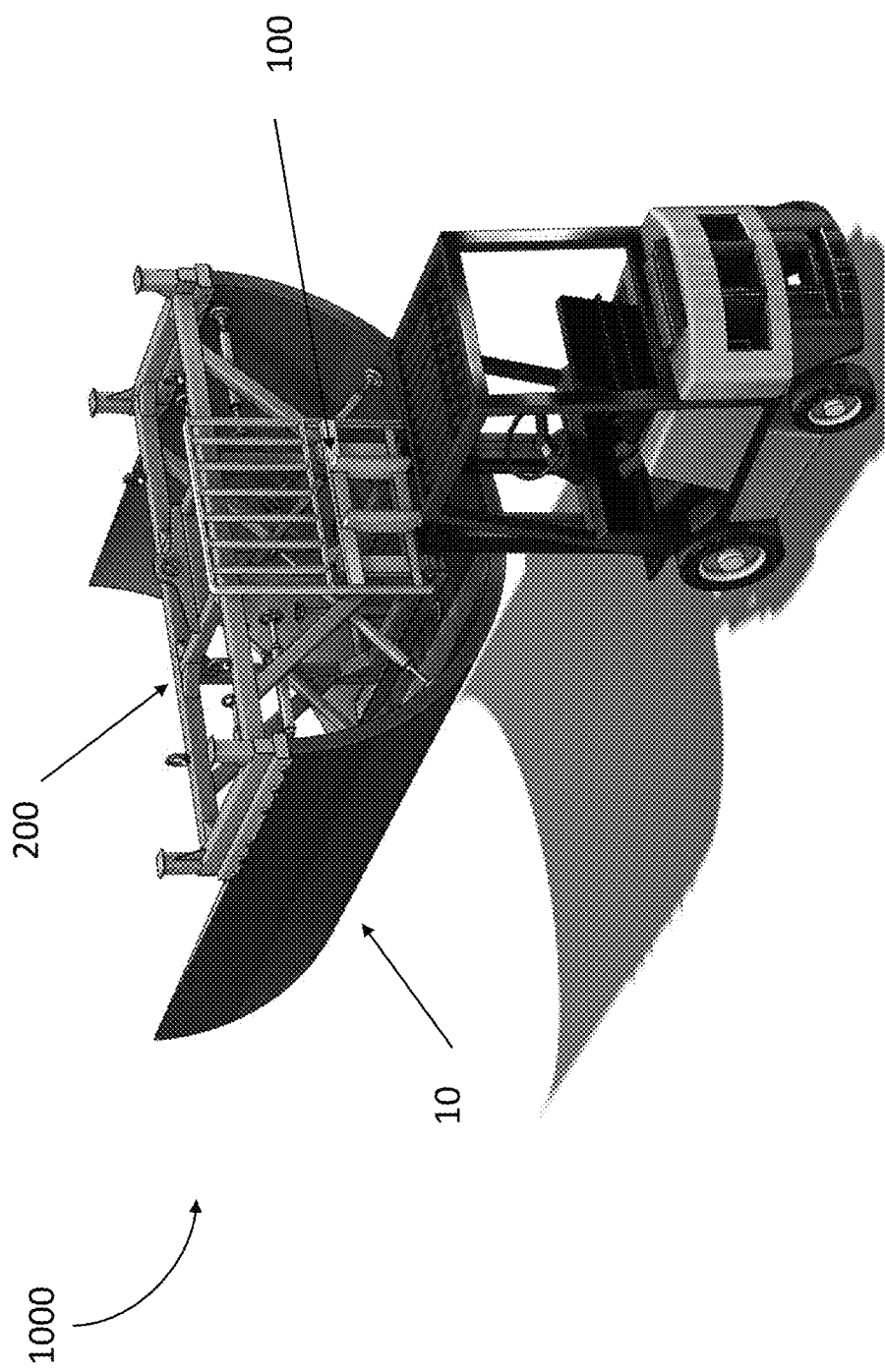
FIG. 1 depicts an exemplary wind turbine blade assembly apparatus, including a root handling fixture in accordance with the embodiments disclosed herein.

As shown in FIG. 1, the system 1000 generally includes a forklift, a forklift adaptor (100) that can be universally sized to receive the fork tines of a variety of forklift models, and a root handling apparatus (200) for receiving a blade root (10). Also, the forklift can be provided with an attachment that allows for the tines of the forklift to rotate as described herein. For sake of illustration and not limitation, the present disclosure focuses on the exemplary use of the blade handling apparatus (200) for use with a half, or semi, root ring (10) portion of a blade, but it is to be understood that the apparatus disclosed herein can be employed in connection with additional blade portions and/or composite structures. These apparatus disclosed herein provides the ability to handle larger wind turbine blades safely, with higher efficiency, accessibility and ergonomics than conventional handling systems.

The apparatus of the present disclosure employs a rigid structure capable of supporting the weight of the root ring (10) when lifted, and has a central longitudinal axis (aligned in the blade span direction, as shown in FIG. 1 which depicts a half, or semi-root ring of an upper surface of the blade from one half of the blade mold) about which the forklift adaptor can rotate (a total of 360°; e.g. 180° clockwise, and 180° counterclockwise).

Figure 2:
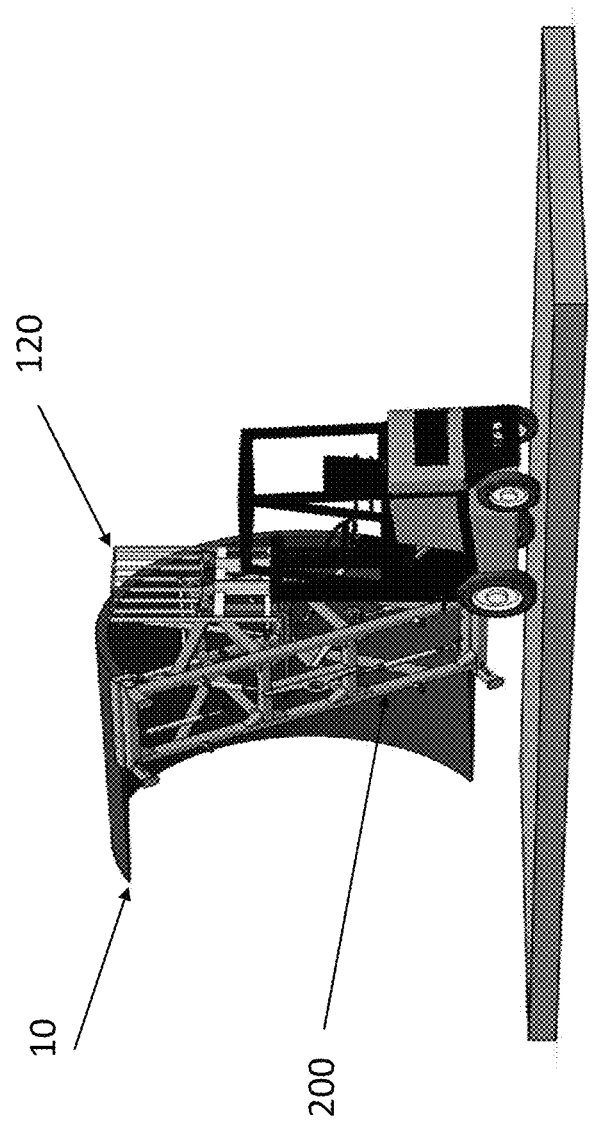
FIG. 2 is another perspective view of the apparatus of FIG. 1, shown with the root and root handling fixture rotated about a horizontal axis.
Figure 3:
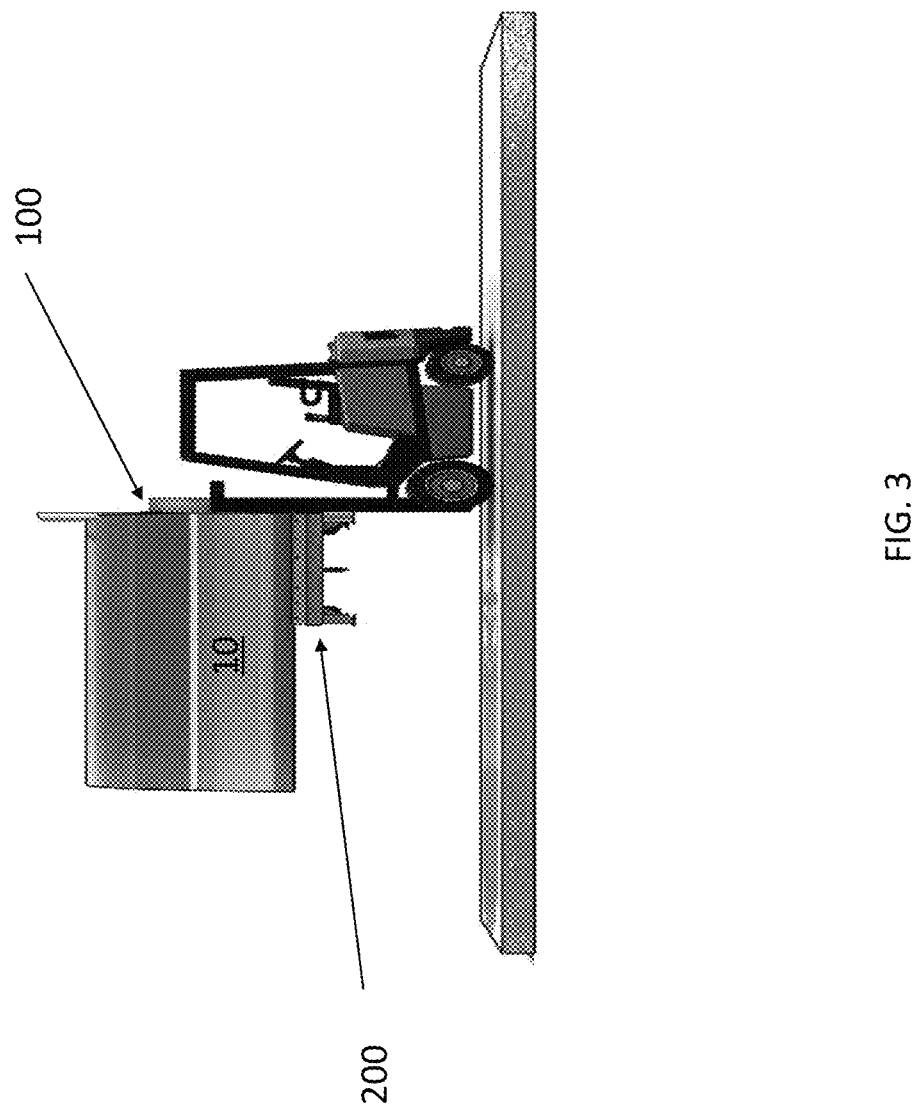
FIG. 3 is side view of the apparatus of FIG. 1.
Figure 4:
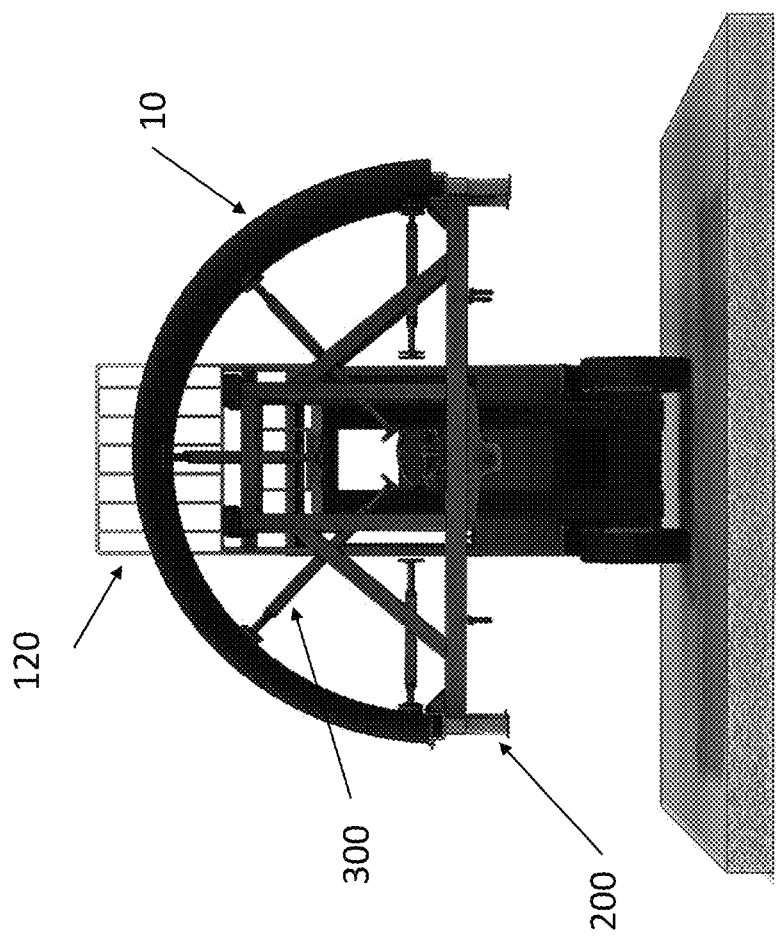
FIG. 4 is a front view of the apparatus of FIG. 1.
Figure 5:
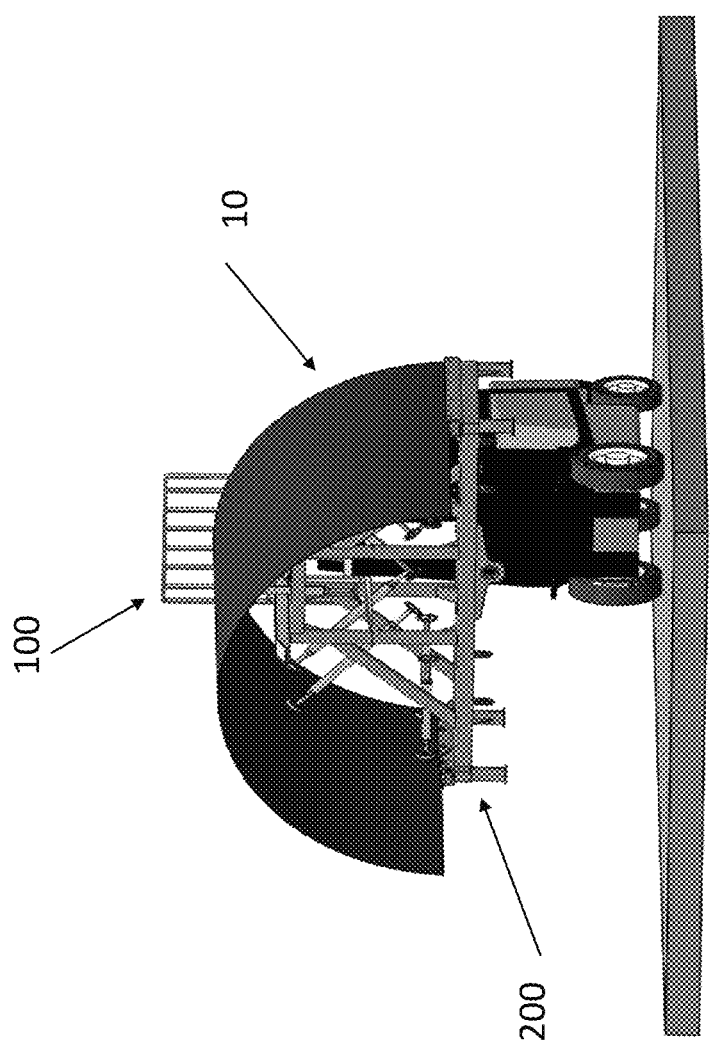
FIG. 5 is a perspective view of the apparatus of FIG. 1.

Stability of the apparatus, when lifting and/or rotating the semi root ring (10) can be maintained by operating within the following conditions presented in Table 1 below and as shown in FIGS. 2-3.

For vertical position:

$F = m*a$ $M = F*r_m*g*r$ $x = r_{equipment}, r_{attachment}$ $y = r_{forklift}$ $z = r_{rootring}$ $F_{equipment} = 230$ kg, $F_{rootring} = 1500$ kg, $F_{attachment} = 300$ kg, Table 1

Assuming the counterclockwise count is positive moment value:

$$\Sigma M_B = F_{equipment}*x + F_{rootring}*(x+z) + F_{attachment}*x - y*F = 0 \quad \text{Equation 1}$$

Which, when the respective values are inserted for the variables of Equation 1 becomes:

$$\Sigma M_B = 230*1.02 + 1500*2.2 + 300*1 - 0.819*F = 0 \quad \text{Equation 2}$$

Which results in: F=4682 kg.

Accordingly, the exemplary embodiment shown can operate with a forklift weight approximately 4,682 Kg. Also, in all three configuration (0°, 90°, 180°) the center of gravity is constrained between two supports, e.g. the tines of the forklift. Therefore, no lateral instability (about x axis) during forklift operation is experienced.

The forklift tines can engage the forklift adaptor (100) to raise or lift the semi-root ring (10) and root handling apparatus (200) to a height at least equivalent to the diameter of the (full) root ring (10) to ensure the semi-root ring (10) has sufficient clearance to undergo a complete rotation without contacting the floor. In some embodiments, the forklift can be moved to the edge of the blade mold, have tines inserted within the forklift adaptor (100) (which can be pre-installed within the root ring of the blade) and raised to lift the semi-root ring (10) out of the blade mold. Accordingly, the present disclosure allows for the root ring (10) be raised and/or rotated without the forklift apparatus engaging or contacting the root ring (10) directly, instead the forklift only contacts the apparatus of the present disclosure, e.g. the forklift adapter (100) and blade handling apparatus (200), thereby avoiding damage to the root ring. In other words, the present disclosure allows for the forklift to lift/rotate the root ring, while the tines of the forklift are located inside the concave section of the root ring.

The forklift adaptor can rotate (as shown in FIGS. 1-3) over 360 degrees, as described above, about a horizontal axis, in clockwise or counterclockwise directions, allowing for the entire root section to be inverted (as shown in FIG. 3), and be locked at any position within its range of movement (thereby allowing inspection and or additional processing steps, if desired).

Forklift Adaptor (100)

The present disclosure includes a forklift adaptor capable of interfacing with standard forklifts to convert the forklift for operation with the root handling apparatus (200). The conventional tines on the forklift can be inserted into the forklift adaptor (100) can be attached to the forklift tines.

Figure 6:
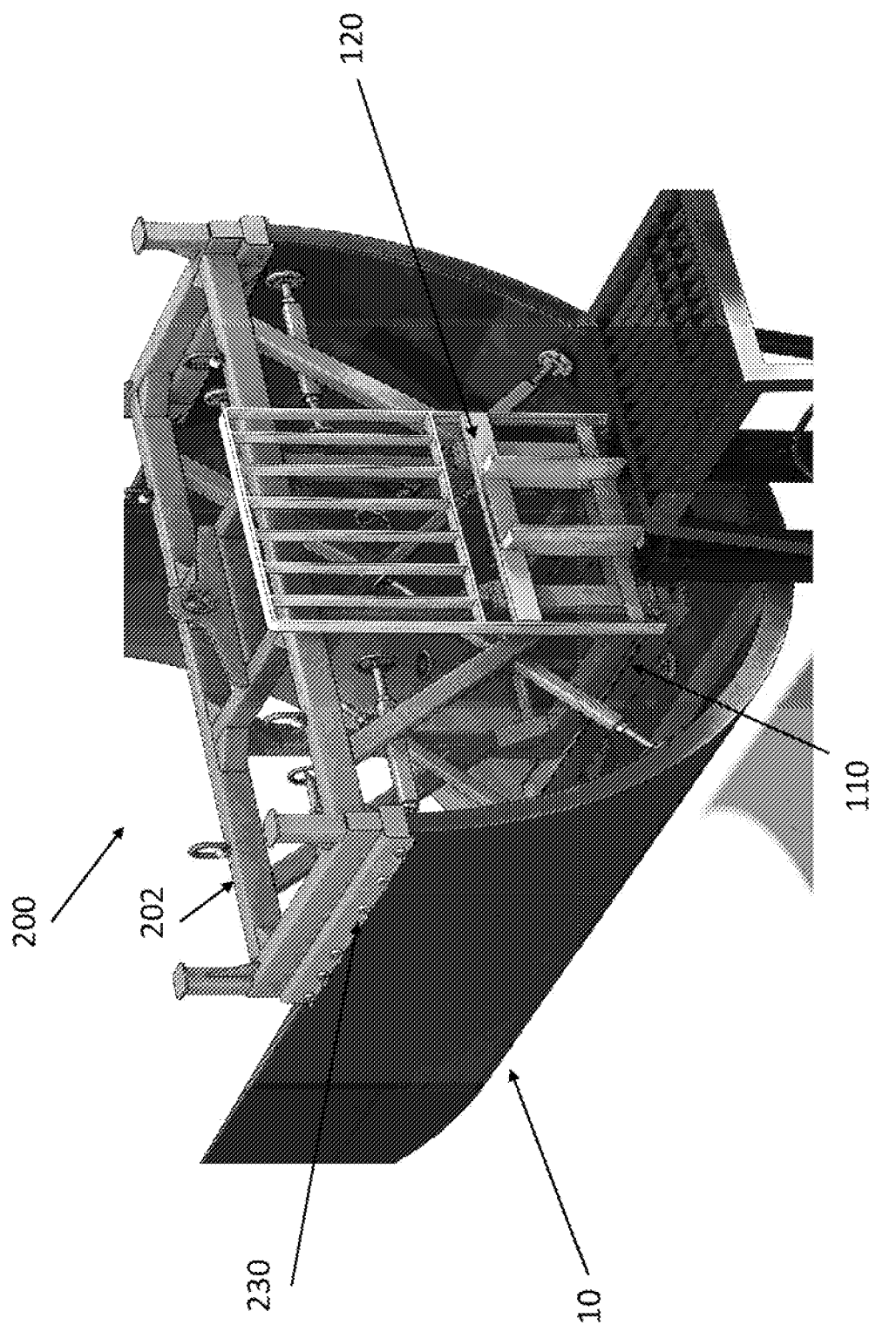
FIG. 6 is a front-perspective enlarged view of the apparatus of FIG. 1.
Figure 7:
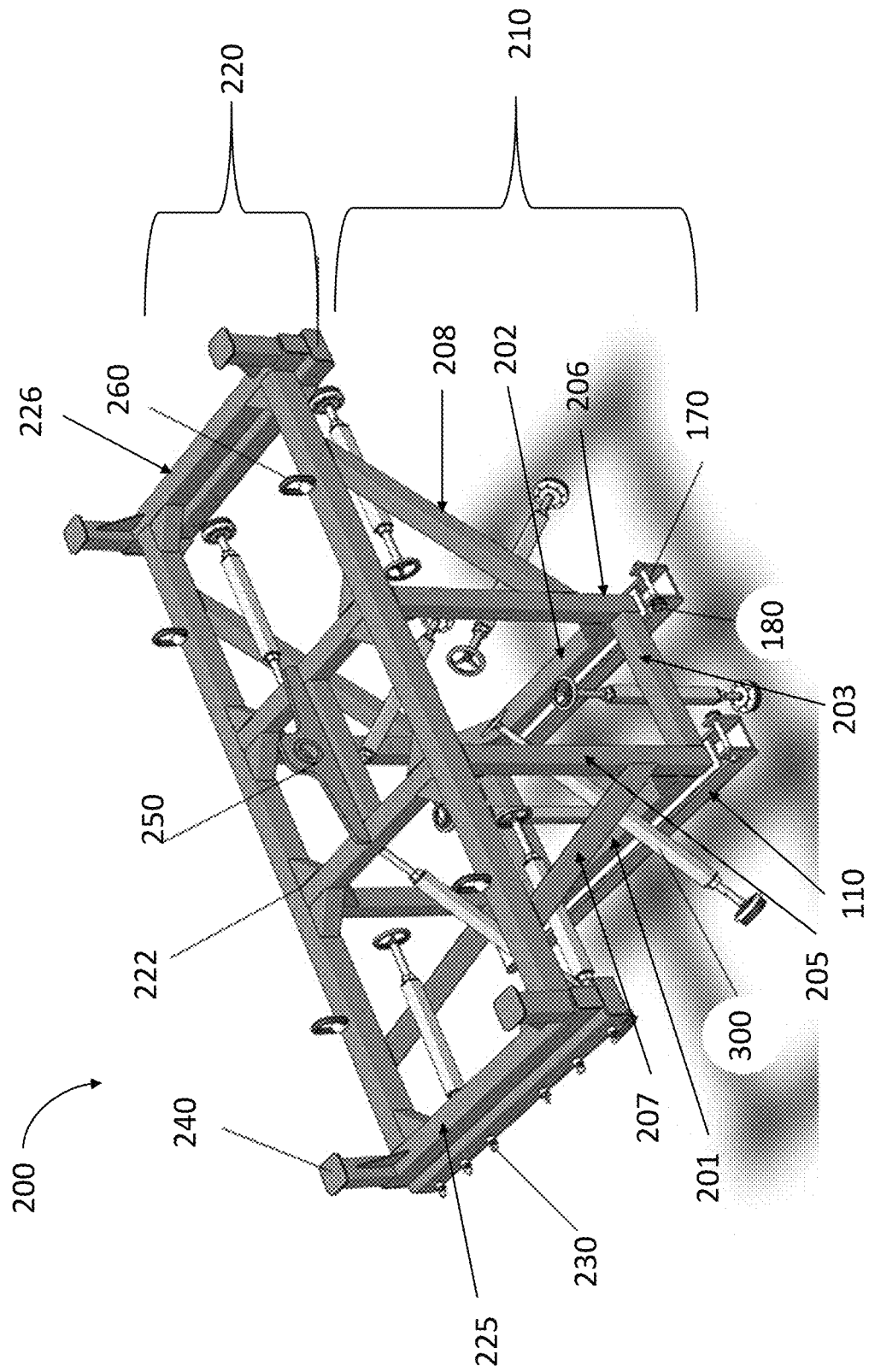
FIG. 7 is an isolated view (root portion removed for clarity) of the apparatus of FIG. 1.

The forklift adaptor includes a base portion (110) and, in some embodiments, a perpendicularly extending endwall/bars (120) (in some embodiments these bars 120 can be permanently attached to the forklift), as shown in FIGS. 6-7. For example the base portion (110) can include a plurality of beams, each beam sized to slidingly receive the tines of the forklift. The spacing between the beams 110 of the base portion can be adjusted as desired to accommodate the spacing between tines of the forklift. Each beam (110) is a rigid rectangular structure that has an opening at the mouth (i.e. side facing the forklift) sized to receive the forklift tines. The base portion (110) supports the blade handling apparatus (200) and root ring (10) during operation with the blade handling apparatus (200) disposed on top of the beams (110); and the blade handling apparatus coupled to the root ring such that all the weight of both the blade handling apparatus (200) and the root ring (10) is distributed through the base portion (100). The endwall/bars (120) serve as a rigid wall preventing any lateral displacement of the blade handling apparatus (200) and root, in an aft direction (i.e. towards the operator of the forklift).

The power to generate the movement (e.g. rotation about the blade longitudinal axis) of the wind turbine blade can be provided in a variety of ways, e.g. electric motor, pneumatic or hydraulic systems. In some embodiments, the power means (and associated wiring, cables or piping, as the case may be) are housed directly within the forklift adaptor. In other embodiments, the power source, and/or auxiliary power systems, can be located external to the forklift adaptor, e.g. housed within the forklift itself.

The base portion (110) of the forklift adaptor and root handling apparatus (200) can be integrally formed, or in some embodiments formed as discrete members which are coupled to form a sub-assembly. The endwall/bars (120) can be sized so as to extend vertically above the blade handling apparatus (200), and root (10), as shown. The dimensions and spacing of the base (110) and endwall/bars (120) can be adjusted to accommodate blades of varying sizes.

Figure 10:
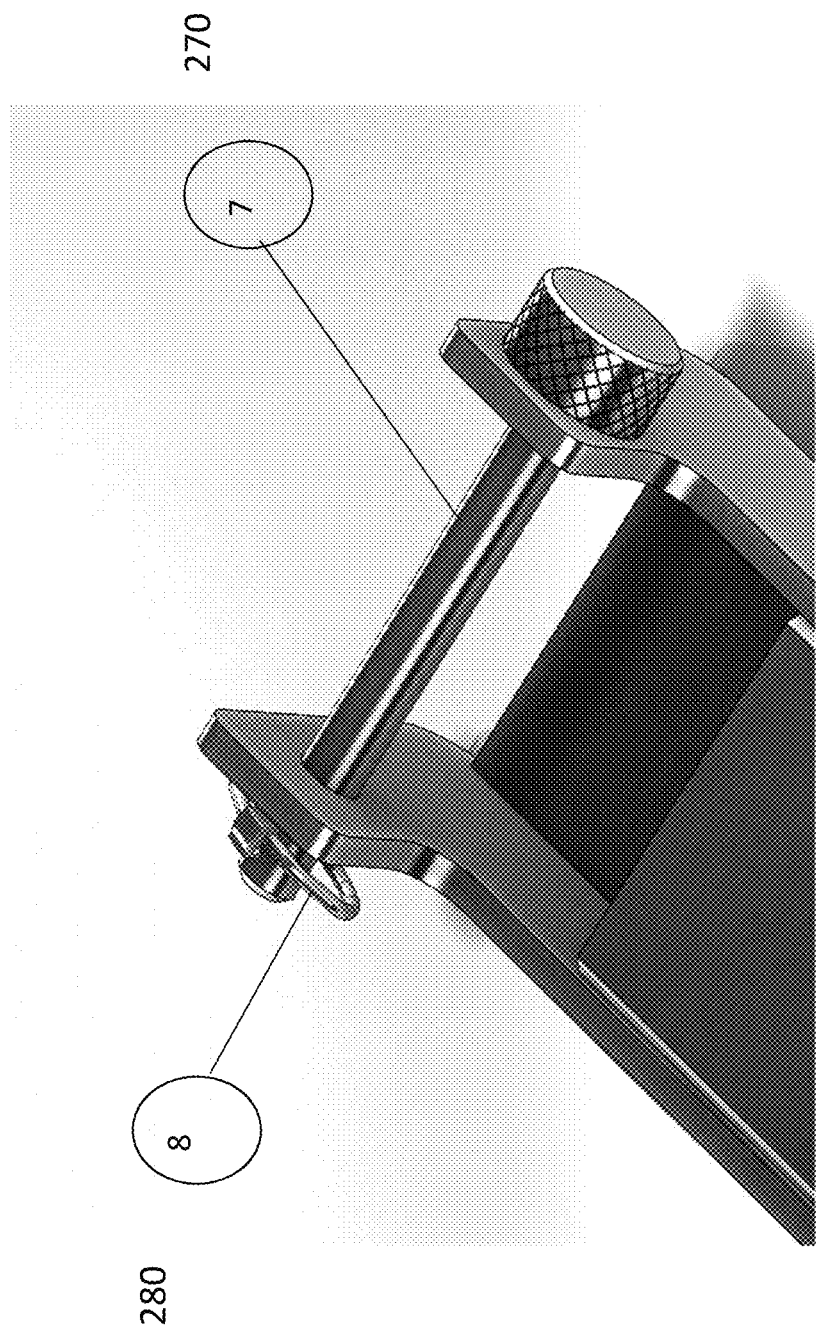
FIG. 10 is a zoom-in view of an exemplary locking pin of the forklift adaptor in accordance with the embodiment shown in FIG. 1.
Figure 11:
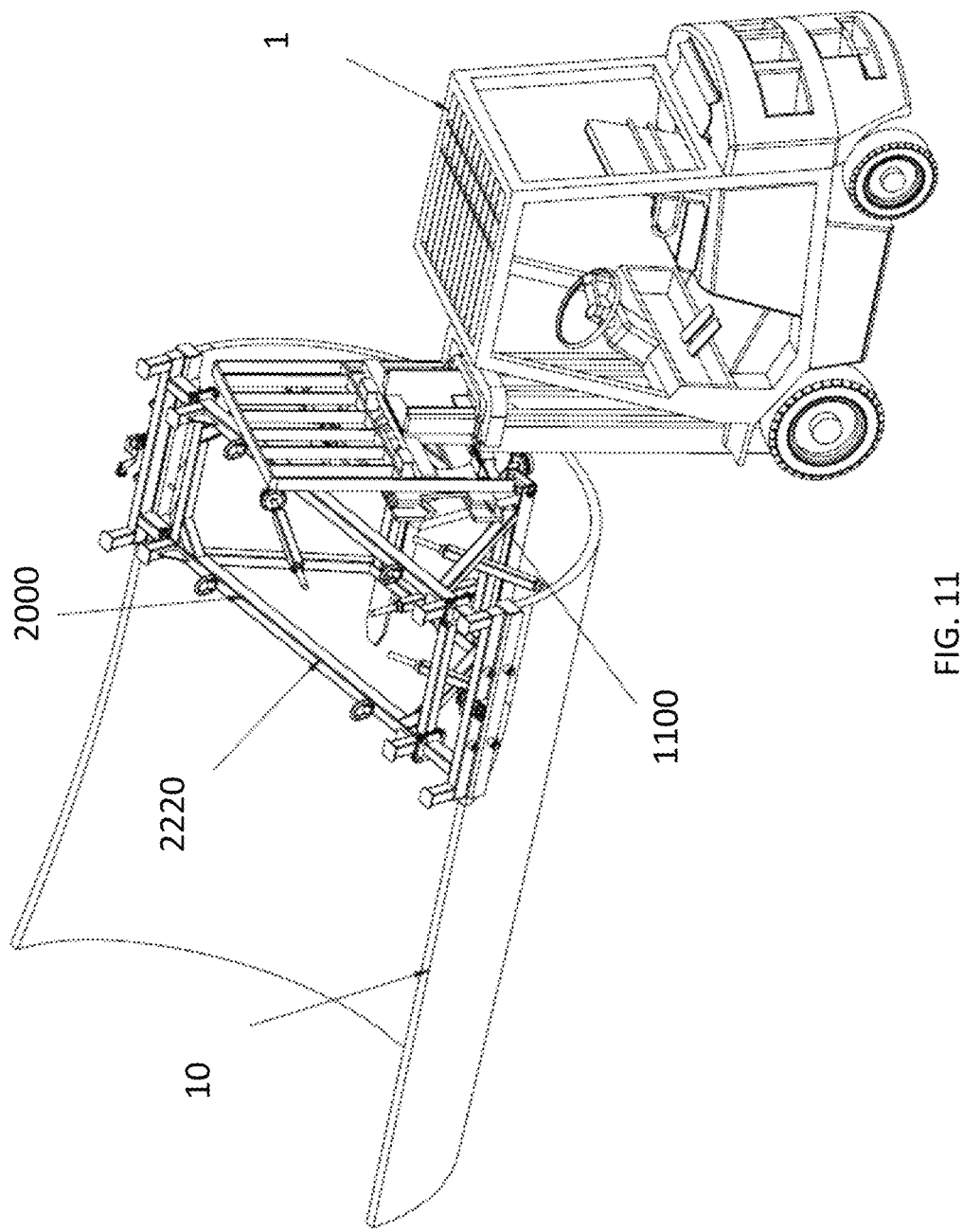
FIG. 11 depicts another exemplary wind turbine blade assembly apparatus, including a root handling fixture.

The base portion (110) includes locking pins (170): for engaging the forklift tines to prevent relative movement between the root handling apparatus (200) and the forklift during operation. Also included are spring loaded pins (180) that are biased to urge the locking pin (170) into a locked configuration to thereby prevent the locking pins (170) from disengaging the forklift, as shown in FIG. 10.

Root Handling Apparatus (200)

The root handling apparatus (200) includes a frame, or chassis, of interconnected struts (202) configured, in the exemplary embodiment shown, with a square first section (210) for engaging the fork lift adapter (100) which receives the tines of the forklift, and a rectangular second section (220) which engages the root ring. The struts can be formed of any suitably rigid material (e.g. steel) capable of withstanding the weights/loads imparted by the root ring, and formed as hollow rectangular members. In the exemplary embodiment show, the root handling apparatus is symmetrical about the x-axis and y-axis, as shown.

The first section (210), or end, has two struts (201, 202) that are aligned with the beams of the forklift adapter (110) so that the root handling apparatus can be permanently (e.g. welded) or releasably attached to the forklift adapter (110), as shown in FIG. 7. A cross strut (203) extends between these two bottom struts (202, 204). Extending vertically upward from the bottom struts (201, 202) are struts (205, 206). Also, buttress struts (207, 208) extend diagonally from the vertical struts (205, 206), and the ends of the buttress struts can be off set from the ends of vertical struts (205, 206).

The second end (220) is larger in dimension than the first end such that the frame (200) is shaped as a generally triangular or trapezoidal structure, with the first end or apex (shown on the bottom in FIG. 7) attached to the forklift tines. The rectangular second end (220) is similarly formed from a series of interconnected struts and includes feet (240) extending from the frame so that the root is spaced above the ground when the apparatus (200) is placed on the floor. Perpendicularly extending struts (222) can extend between the struts defining the perimeter of the frame, these along with the angled buttress struts provide rigidity for torsional loads imparted during lifting/rotating of the blade root (10). The perpendicular struts (222) of the second end of the frame can be aligned to intersect the perimeter of the second end of the frame at a location that coincides with the vertical struts (205, 206) of the first end of the frame.

The root handling apparatus (200) can be a single, integral unit, or can be comprised of a plurality of discrete components (e.g. individual struts) which can be joined together or otherwise connected to be inserted within the root ring. Additionally, the root handling apparatus (200) can be positioned at any desired location along the root ring (e.g. proximate the mouth, or root end of the root ring that is attached to a nacelle; or proximate the tip end of the root ring). In some embodiments, the center of gravity of the root ring (10), the root handling apparatus (200) and forklift adapter (100) are all aligned with the center of gravity of the forklift.

The root handling apparatus can also include feet (240) that extend vertically from the perimeter of the frame (220), which are located in the corners of the frame as shown. These feet (240) allow for placement of the root handling apparatus (230) on the floor (while keeping the root ring, if attached, elevated. After turning the semi-root part (10) 180 degrees from the convex orientation to the concave orientation, the feet are placed on the floor and any desired process/repair, e.g. trimming, can be easily performed without obstruction or risk of injury.

Figure 9:
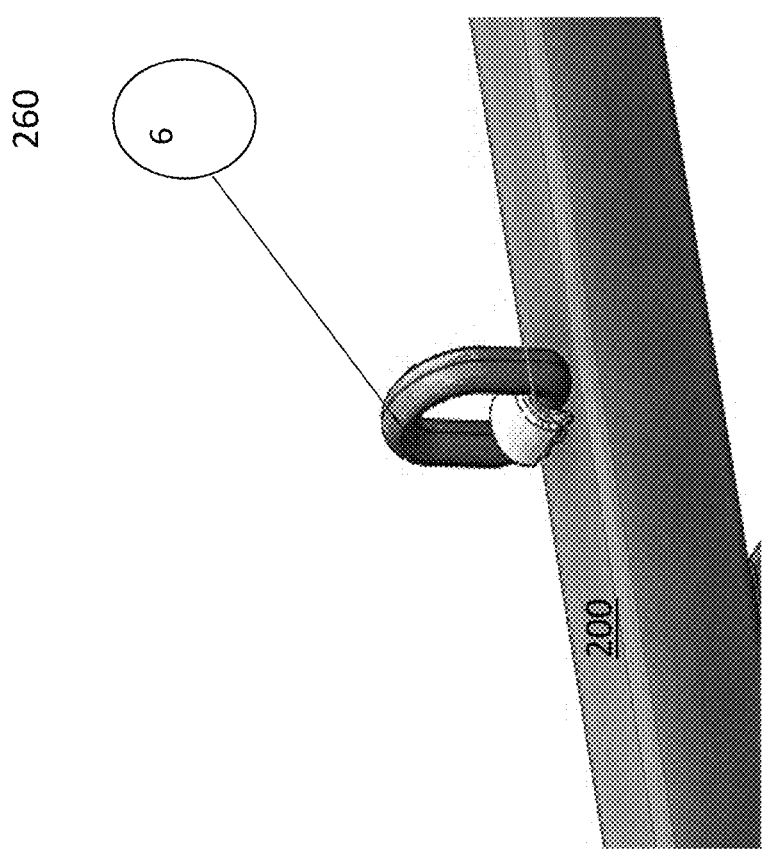
FIG. 9 is a zoom-in view of an exemplary overhead attachment mechanism of the apparatus of FIG. 1.

In some embodiments, root handling apparatus can also include a lifting plate (250) for an overhead lifting mechanism (e.g. crane) to lift the root handling apparatus (and root ring, if attached). The lifting plate (250) can extend between perpendicular struts (222) and have a linkage hole aligned with the center of gravity of the root handling apparatus (200) (and root ring, if attached) to prevent twisting/turning moments, as shown in FIG. 7. Additionally or alternatively, crane linkage members (e.g. eyebolts) (260) can be included on the upper surface of the frame (220) for overhead lifting and positioning, similar to the lifting plate (250). In the exemplary embodiment shown, two pairs (i.e. four in total) linkage members are aligned on the upper surface of the frame (220), as shown in FIG. 9. An overhead crane may engage only one of the connection points (250, 260), or the overhead crane can engage all the connection points (250, 260) to provide more secure handling and positioning of the root handling apparatus (and root ring, if attached). Feet (240) extend a greater distance than these lifting structures (i.e. lifting plate and/or linkage members) to provide clearance such that none of the lifting structures touch the floor when the root handling apparatus is placed in an upright position with feet (240) engaged with the floor.

In accordance with another aspect of the present disclosure, the root handling apparatus (200) can be releasably coupled to the root ring. The peripheral struts (225, 226) of the frame (220) can include channels defined by sidewalls on the opposite side of the feet (240) for receiving the edges (or flanges) of the root ring (10). The width of the channels can be sized so that the outermost sidewall of the channels (225, 226) is disposed outside of the root ring and overlaps a portion of the exterior surface of the root ring (10), and the innermost sidewall of the channels is disposed inside the root ring and overlaps a portion of the interior surface of the root ring (10). Thus, the root ring (10) sits within the channels (225, 226).

A series of connection pins (230) can be inserted to extend through these sidewalls (225, 226), and the root ring (10) positioned within the channels defined by these sidewalls, to couple the root handling apparatus (200) to the root ring (10), as shown in FIGS. 1-6. In the exemplary embodiment shown in FIGS. 6-7, six pins (230) are provided on each sides of the frame (220), but an alternative number can be employed as necessary to provide sufficient bond strength to accommodate root rings of varying size/weight.

As shown in FIG. 6, the root handling apparatus (200) can be positioned with a majority, or all, of the struts disposed within the interior of the root ring, and the struts (225, 226) at the lateral sides of the apparatus engaging the semi root ring (10) across the thickness of the root ring. The connection pins (230) can be mechanical couplings which extend through an exterior surface of these lateral side struts and through the semi root ring thickness to securely attach the two structures. The number and location of the connection pins (230) can vary depending on root ring geometry and weight, e.g., can be spaced uniformly along the root ring length, or dispersed in gradient fashion with a higher concentration coinciding with a greater thickness of the root ring (i.e. proximate the hub end). The apertures formed in each half of the semi root rings for receiving the connection pins (230) when connected to the root handling apparatus (200), conveniently serve as the bonding locations once the two semi root rings are assembled into a complete root ring.

Adjustable Tension Rods (300)

In accordance with yet another aspect of the disclosure, tension rods (300) can be included to exert a tensile force on the interior skin surface of the root ring (10) to maintain a desired geometry, as shown in FIGS. 1-7. The tension rods (300) are (independently) adjustable in length so that the amount of force exerted on the root ring can be tailored as needed to ensure proper geometry of the ring is maintained during transit to prevent any undesired deformation (e.g. warping).

During operation (e.g. lifting/rotating) of the root ring, the tension rods (300) elongate, or shorten, (e.g. in a telescoping manner) to apply a force to an inner surface the root ring to counteract external loads, in order to: i) stretch/tighten the composite skin in a radial direction to maintain a desired geometry; and ii) prevent deformations or shifts in the center of gravity of the root ring. In some embodiments the tension rods (300) can be preset with a limited range of displacement to prevent excessive force/tearing of the root ring skin. Additionally or alternatively, the tension rods (300) can include an alarm/signal (visual or audible) to alert an operator of the magnitude and/or rate of displacement of the rods.

Figure 8:
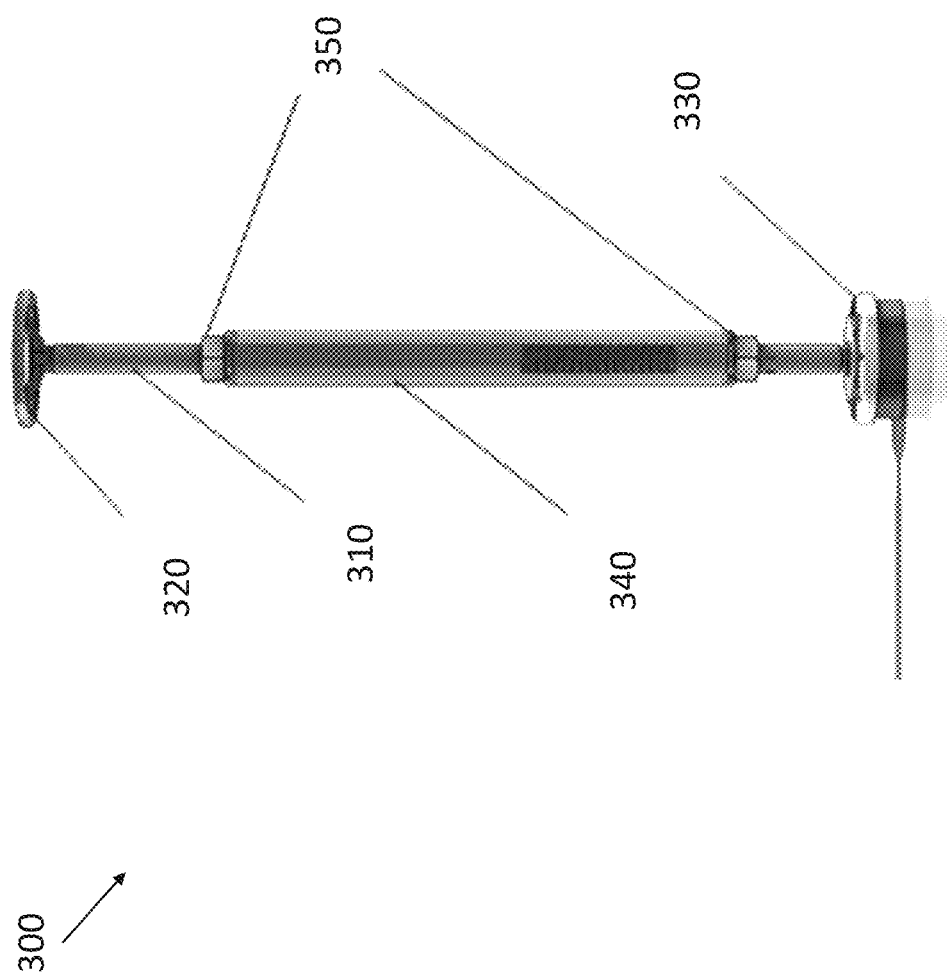
FIG. 8 is front view of a single tension rod of the apparatus of FIG. 1.

FIG. 8 shows an isolated view of an exemplary tension rod (300) which includes a stud bolt (310) for transferring force to the vibration dampening shoe (330) from the actuator (320) (which in the exemplary embodiment can be a wheel/gear) to stretch/compress the semi-root ring. The actuator (320) can be manually, and/or automatically, operated to preset lengths, or level(s) of tension, or adjusted to any desired level as determined by a technician. The adjustment can be gradual, or can be performed in abrupt stepped increments. In some embodiments the extension of the shoe experiences increasing resistance as the shoe (330) is extended further. The actuators (320) of the tension rods can be adjusted/operated independently of each other. Additionally or alternatively, the actuators can operate in unison such that all shoes (330) engage the root ring simultaneously. The actuators can be actuated via manual, electrical, pneumatic or hydraulic means.

The vibration dampening shoe (330) can be located at a distal end of the tension rod (300) and can include a skid resistant surface (e.g. PUR material) for contacting the root ring skin. The shoe (330) can be adjusted/repositioned as desired to obtain the appropriate angle (e.g. pitch) of orientation with respect to the root ring. In the exemplary embodiment shown, the shoes are oriented at a 45 degree and 90 degree angle with respect to the horizontal axis. A housing (340) is provided to receive the stud bolt (310) and has an outer diameter larger than the outer diameter of the stud bolt (310). Bolt nuts (350) can be attached at both ends of the housing (340). The bolt nuts (350) can be permanently attached (e.g. welded) to the housing (340) and serve as the contact point for generating the dampening force delivered by the tension rod (300) to the shoe (330).

The tension rods (300) can be anchored to the struts of the root handling apparatus (200), and angled as desired to engage the interior surface of the root ring (10) at predetermined locations. For example, the tension rods (300) can be welded (at a midpoint of the tension rod) to a particular frame strut so that the tensile force is distributed with respect to the root handling apparatus (200) into the root ring (10). Alternatively, the tension rods can be removably attached to the struts (e.g. clamping, or complimentary interlocking mechanical coupling such as a tongue/groove mating with the struts) so that the tension rods can be relocated to alternative positions on the struts and/or alternative spacing between neighboring tension rods (300). In the exemplary embodiment shown in FIG. 7, ten tension rods (300) are employed with four of them oriented at approximately 45 degrees to the longitudinal (or spanwise) axis of the root ring (10), and four oriented laterally towards the flanges of the root ring and perpendicular to the longitudinal (or spanwise) axis as well as perpendicular with the struts (225, 226). The two remaining tension rods are located within the first portion (210) of the root handling apparatus frame and oriented vertically, perpendicular to the longitudinal (or spanwise) axis.

The exemplary embodiments illustrated depict a mechanical connection between the root handling apparatus (200) and the root ring (10), however alternative connection can be employed. For example, the connection pins (230) can, instead of a pin and nut fastener union, be a vacuum coupling along the perimeter of the blade root ring and root handling apparatus (200) interface. Such a vacuum coupling would be advantageous in that it provides for a more universal design capable of accommodating a wide variety of blade root design sizes/shapes. The geometry of the vacuum pads are complimentary to the shape of the root ring perimeter to ensure proper coupling. In some embodiments, a combination of mechanical and vacuum connections are made between the root handling apparatus (200) and the root ring (10). This is beneficial in that mechanical couplings can be provided, e.g. at the bottom of the semi root ring which allow for a slow/deliberate disconnection that can serve as a safety measure against undesired abrupt disconnection of the vacuum coupling to prevent the root ring from accidentally dropping.

FIGS. 11-29 disclose another exemplary embodiment of the present disclosure. Similar reference numerals (differentiated by an additional numeral "0" as a suffix) may be provided among the various views and Figures presented herein to denote functionally corresponding, but not necessarily identical structures as described with respect to the embodiment of FIGS. 1-10. The descriptions provided above equally apply for the common features disclosed across the embodiments. For purpose of illustration and not limitation, some exemplary dimension are provided in the drawings, but it will be understood that alternative dimensions are within the scope of this disclosure.

Figure 17D:
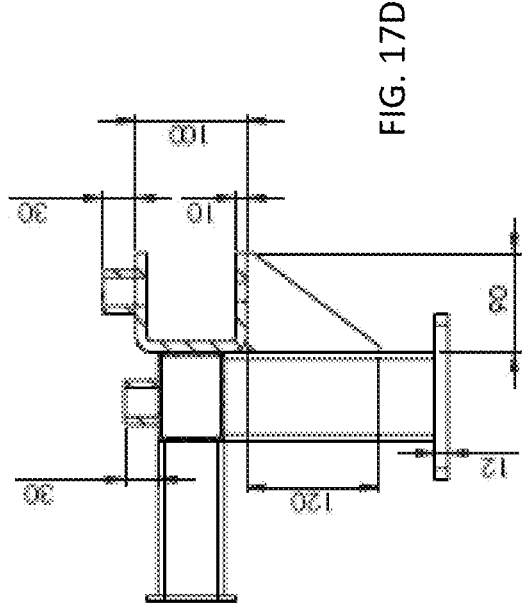
Figure 17B:
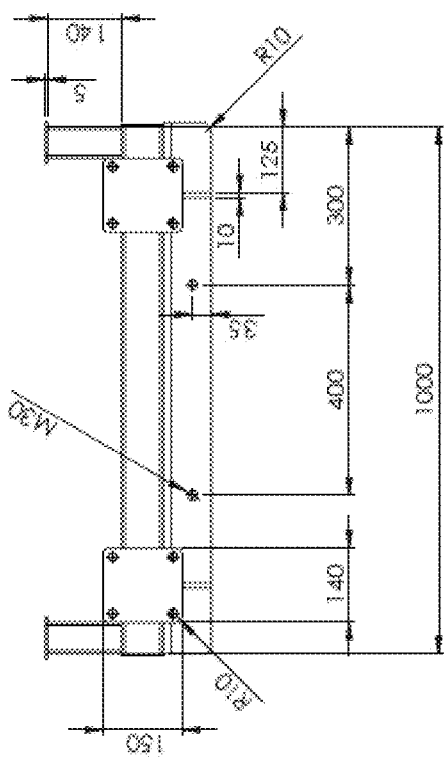
Figure 17C:
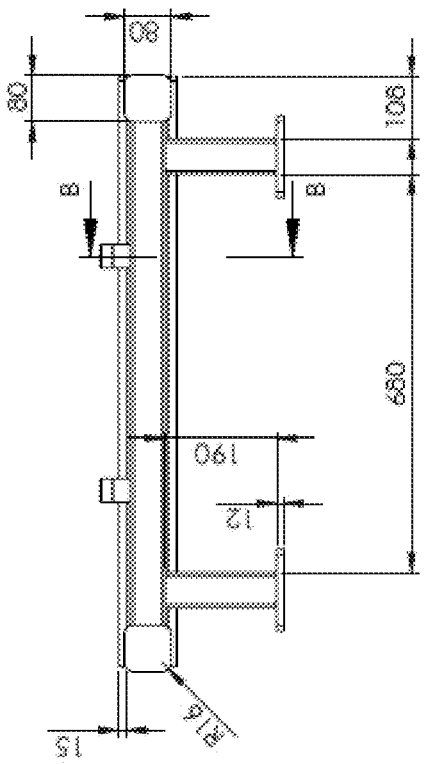
Figure 18A:
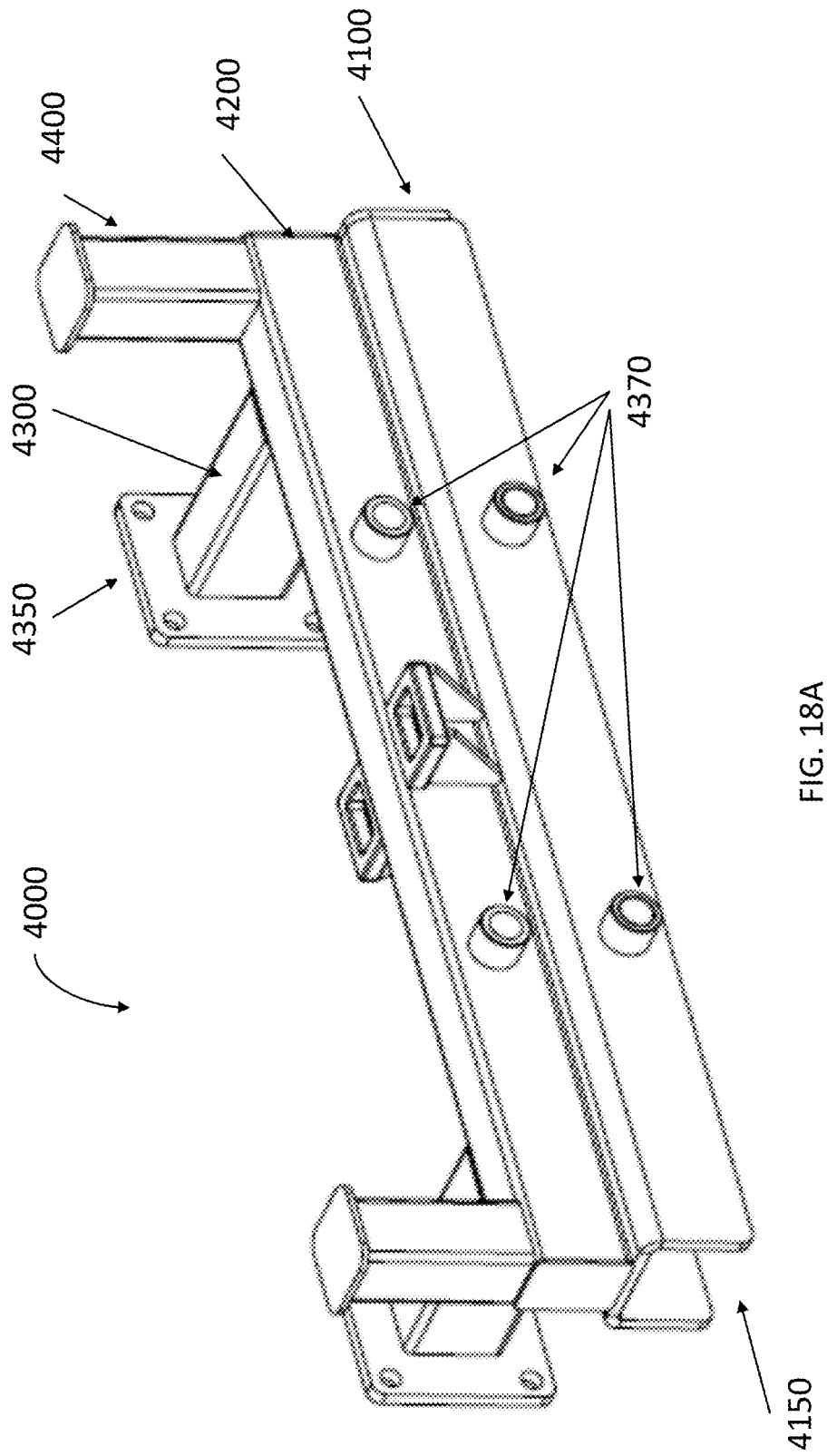
FIGS. 18A-C depict perspective, top and cross sectional views of the root ring attachment of the embodiment shown in FIG. 11.
Figure 18C:
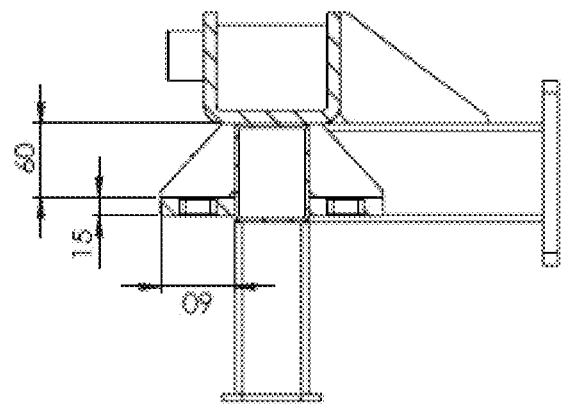
Figure 18B:
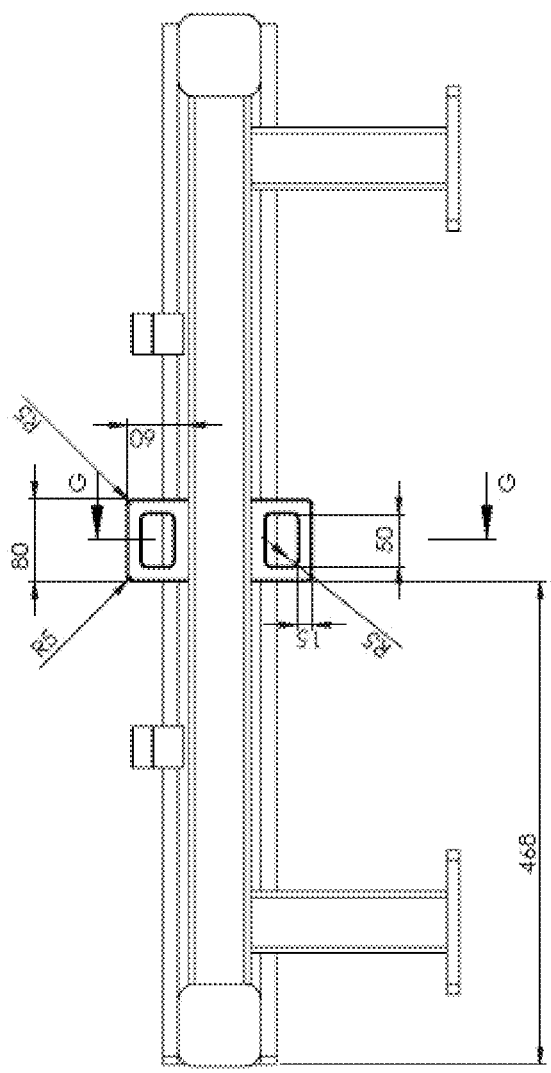

The embodiment shown here includes a composite connection attachment (4000), shown in isolation in FIGS. 17-18, which can be attached to or removed from the frame (2000), which has an alternative geometry. The universal root ring (or composite connection) attachment (4000) has the arm lengths which can be adjusted as desired to provide a universal apparatus suitable for use in any root ring design.

Root Handling Apparatus (2000)

Figure 12:
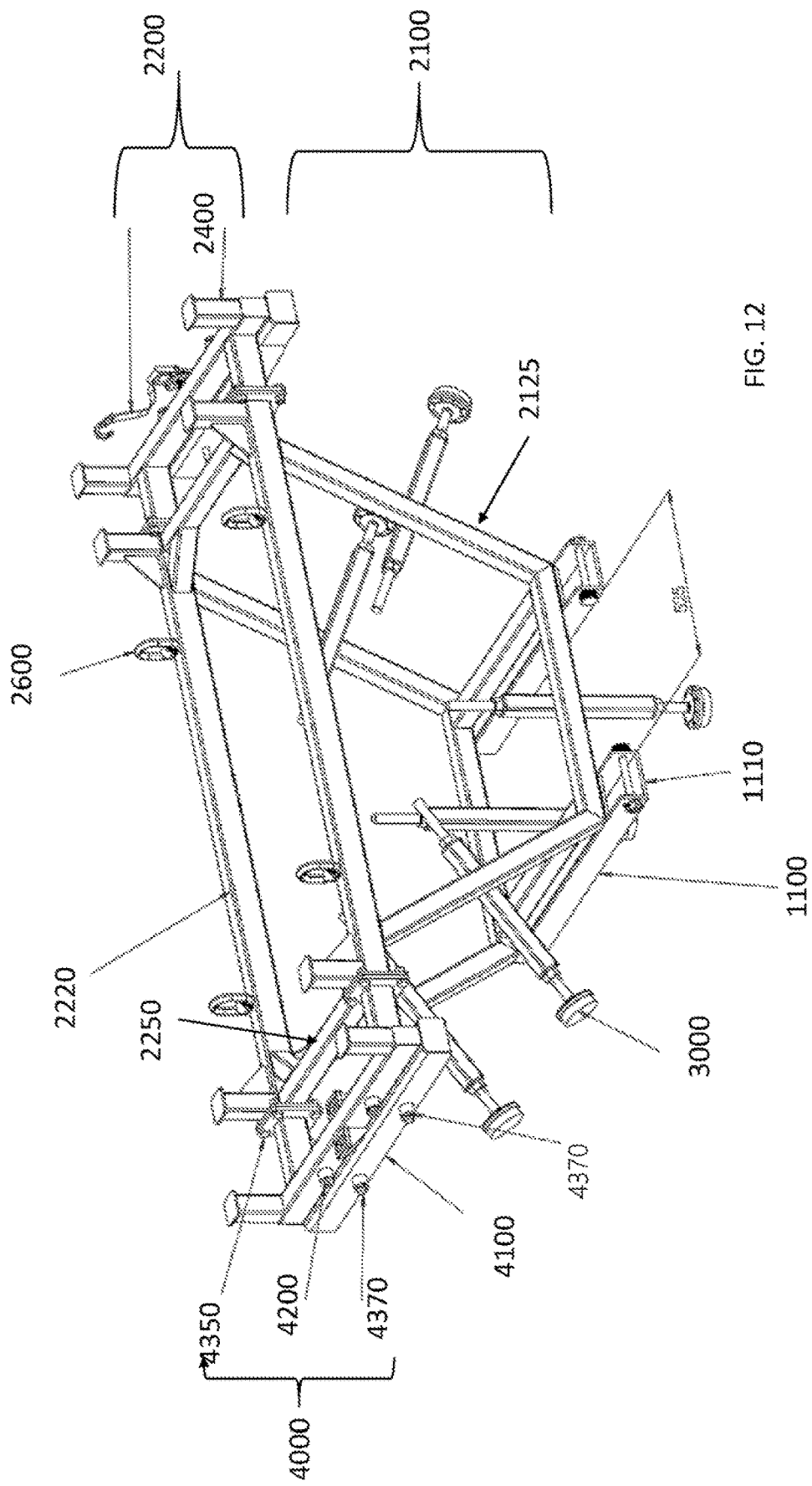
FIG. 12 depicts an isolated view of the root handling apparatus and root ring attachment of the embodiment shown in FIG. 11.

The root handling apparatus (2000) of this embodiment can be constructed similarly to the prior embodiment, e.g. having a generally trapezoidal shape with a first section 2100 and a second section 2200, as shown in FIG. 12. In this embedment there are no cross struts or beams, instead the first portion 2100 includes a generally square bottom with diagonally (e.g. 45~75 degrees) extending struts which connect to the rectangular struts 2220 forming the second portion 2200. Accordingly, this embodiment is lighter than the previously described embodiment. Feet 2400 and lifting features 2600 can be included as previously described. The lateral edges of the frame 2200, which coincide with the leading and trailing edges of the root ring and turbine blade, are defined by struts 2250. Extending laterally outward from this strut 2250 is the universal ring attachment 4000.

Figure 13:
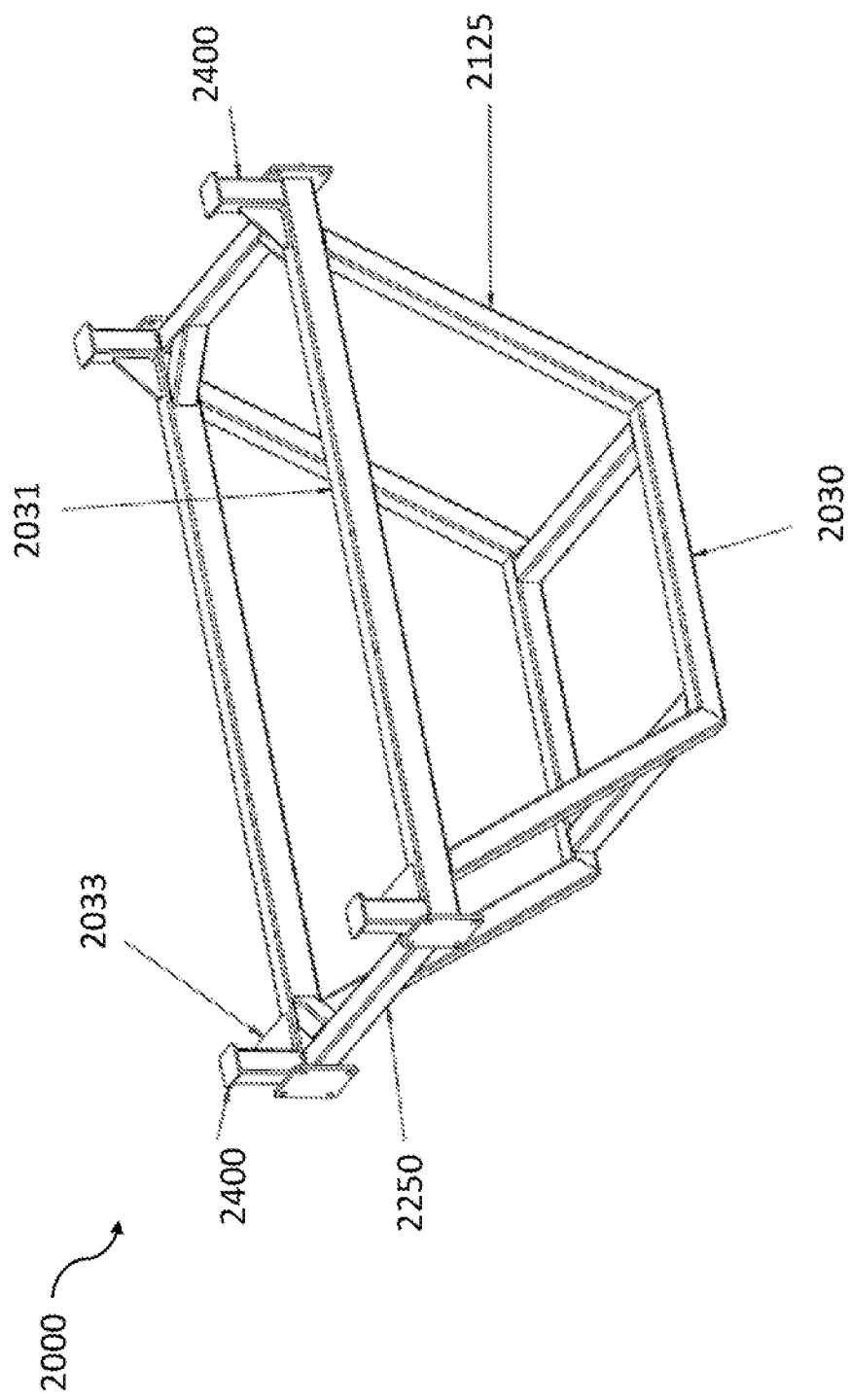
FIG. 13 depicts an isolated view of the root handling apparatus of the embodiment shown in FIG. 11.
Figure 14C:
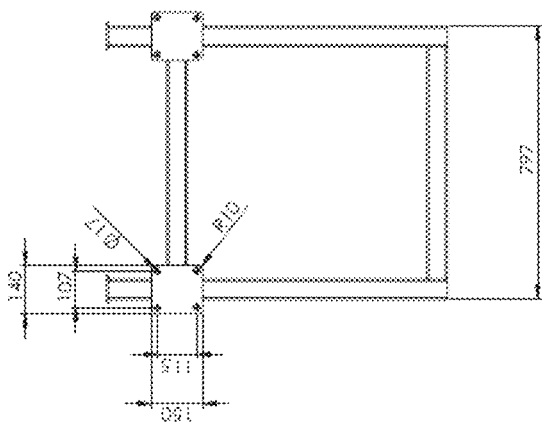
FIGS. 14A-C depict front, top and side view of the root handling apparatus of the embodiment shown in FIG. 13.
Figure 14A:
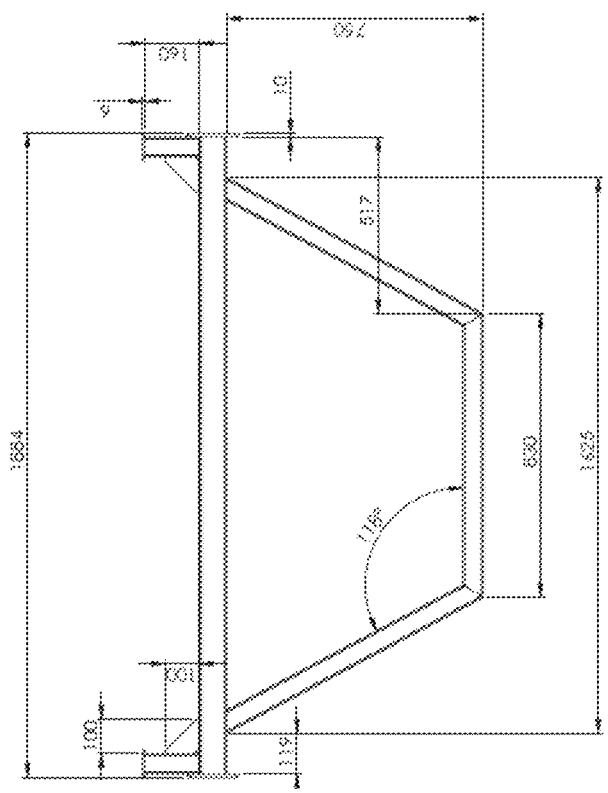
Figure 14B:
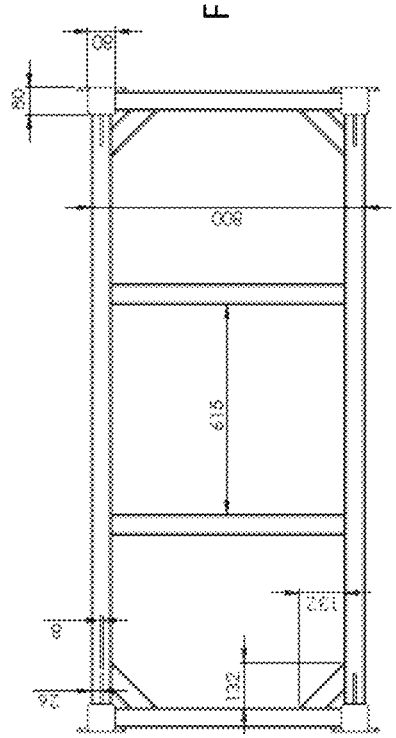

An isolated view of the root handling apparatus is shown in FIGS. 13-14, showing the square lower struts 2030 and the upper rectangular struts 2031 which are interconnected by diagonal struts 2125. Feet 2400 can be supported by buttress flanges 2033. The lateral edge struts 2250 can include attachment plates at the corners to receive the universal root ring attachment 4000, as described below. Each strut can be formed from metal (e.g. steel, aluminum, etc.) with a square profile of, e.g., 80×6 mm².

Forklift Adapter (1100)

Figure 15A:
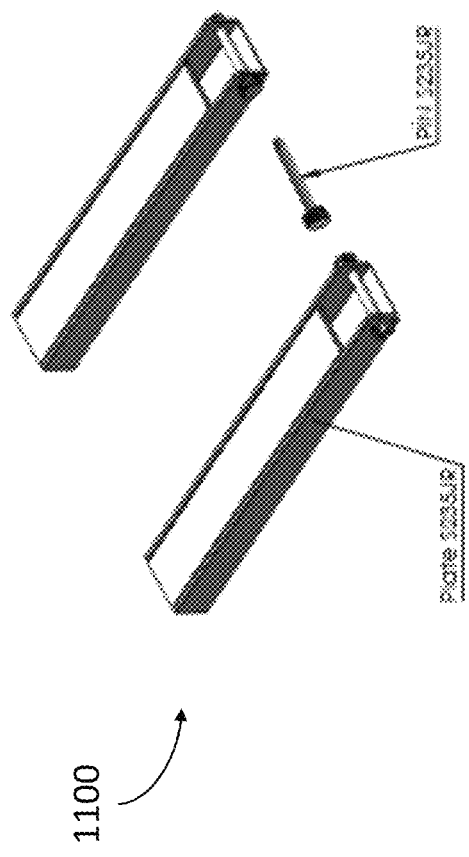
FIGS. 15A-B depicts an isolated perspective, and cross sectional view of the forklift adapter of the embodiment shown in FIG. 11.
Figure 15B:
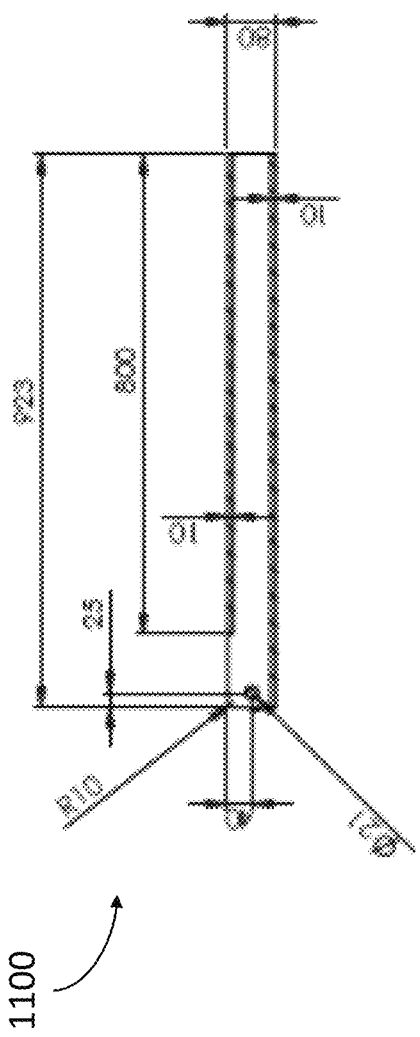

Also, the forklift adapter 1100 can be included which has an opening at the mouth 1110 to receive the tines of the forklift 1 as previously described. FIG. 15 illustrates an isolated view of the forklift adapter 1000. As previously noted, the forklift handling apparatus is attached on top of the forklift adapter 1100.

Tension Rods (3000)

In this embodiment, six tension rods 3000 are employed, with each tension rod attached, e.g. at a midpoint, of the diagonal struts 2125 that extend between the first 2100 and second 2200 portions of the root handling apparatus 2000; and two vertically oriented tension rods attached to the forward and aft cross struts 2100.

Universal Root Ring Attachment (4000)

The root ring attachment, shown in isolation in FIGS. 17-18, allows for a universal root handling apparatus frame to be employed for any root ring design, as the root ring attachment 4000 can be adjusted to accommodate root rings of differing sizes. That is, the arms of the root ring attachment can be sized as needed to accommodate a specific root ring geometry, and then connected (e.g. welded) to both lateral sides of the root handling apparatus 2000.

As shown in FIGS. 17-18, the root ring attachment 4000 includes a first strut 4100 which is configured as a U-shaped strut to receive the semi root ring 10. As shown in FIG. 19A, a first side of this strut can have an opening 4150 with the sidewalls defining a channel to receive the root ring; the opposing end can be closed with an endwall 4160, as shown in FIG. 17A. As described above, the sidewalls defining the channel engage inner and outer surfaces of the root ring 10. A second strut 4200 is disposed on top of the first strut 4100 and fixedly attached thereto (e.g. welding). The endwall 4160 can be used as a point of reference such that the edge of the root ring can be inserted within this channel until abutting the endwall 4160, thereby confirming to the operator that a sufficient surface area of the root ring 10 is inserted within root ring attachment 400 to ensure there is a sufficient bond/union to lift the root ring 10.

Two feet 4400 extend vertically from the second strut 4200 a distance equivalent to the feet 2400 of the root handling apparatus. Arms 4300 extend perpendicularly inward from the proximal and distal ends of the root ring attachment and include mounting plates 4350 for coupling (e.g. bolts, rivets, etc.) with a complimentarily shaped mounting plate on the lateral edges of the root handling apparatus 2000. On the opposite side, apertures 4370 can be formed in both struts 4100 and 4200, with the male attachment mechanism (e.g. pins) inserted through the lower apertures in strut 4100 passing through the root ring 10. Accordingly, this embodiment reduces the number of perforations made in the root ring 10 from twelve (as previously shown) to four, thereby reducing complexity and risk of damage to the root ring.

Figure 20:
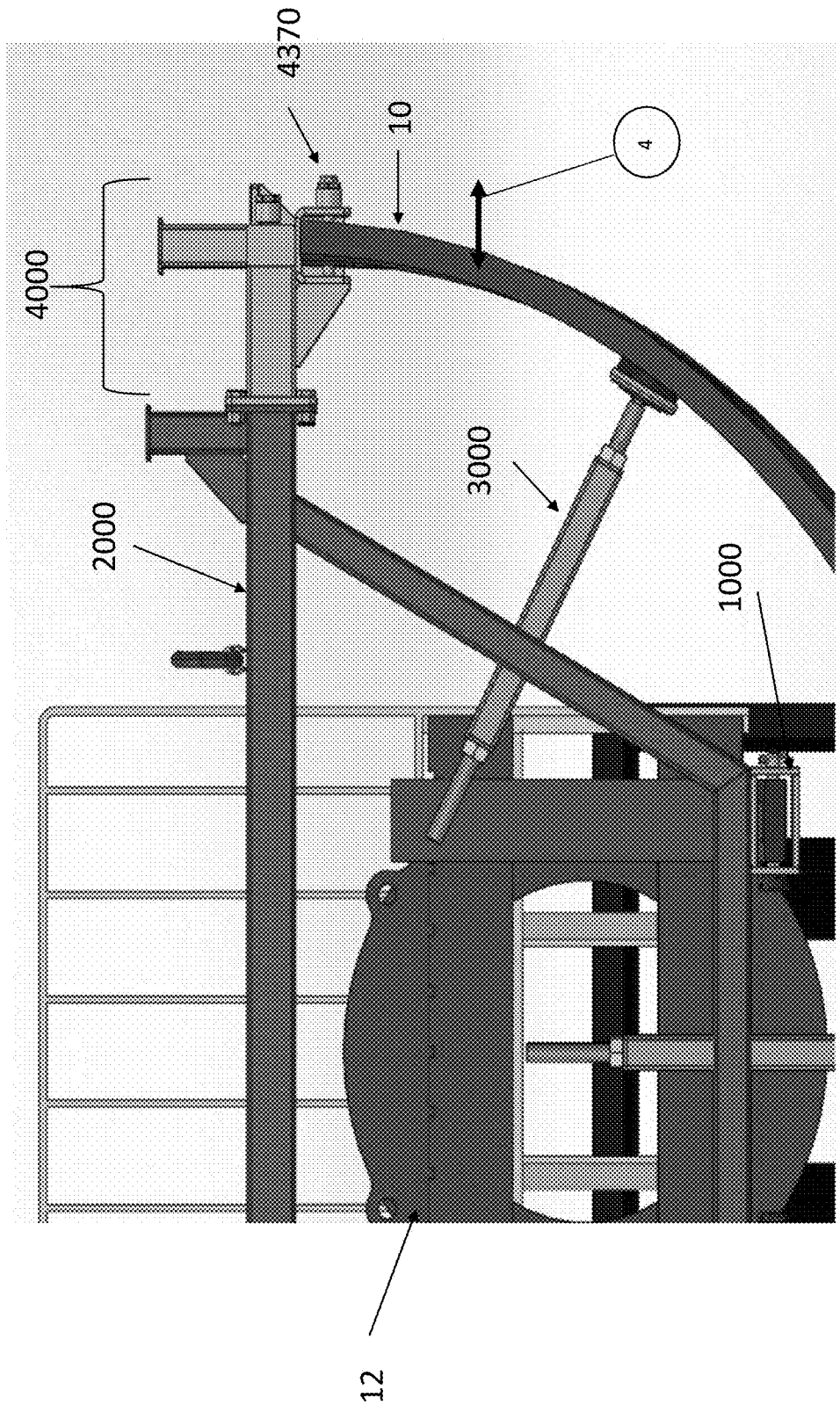
FIG. 20 is a front (span wise) view of the root handling apparatus and root ring attachment and forklift and root ring of the embodiment shown in FIG. 11.
Figure 21:
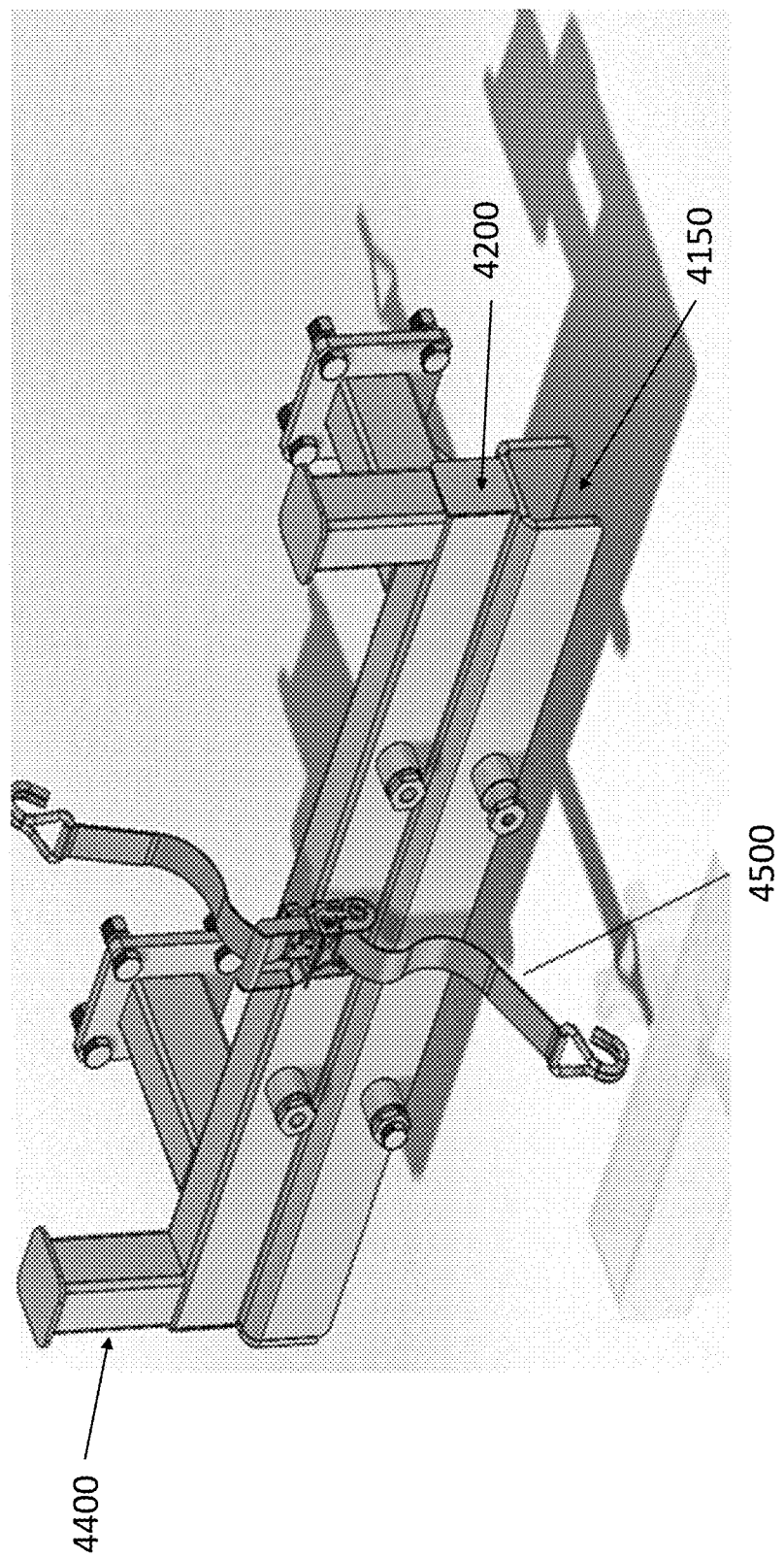
FIG. 21 depicts a perspective view of the root ring attachment of the embodiment shown in FIG. 11.
Figure 22:
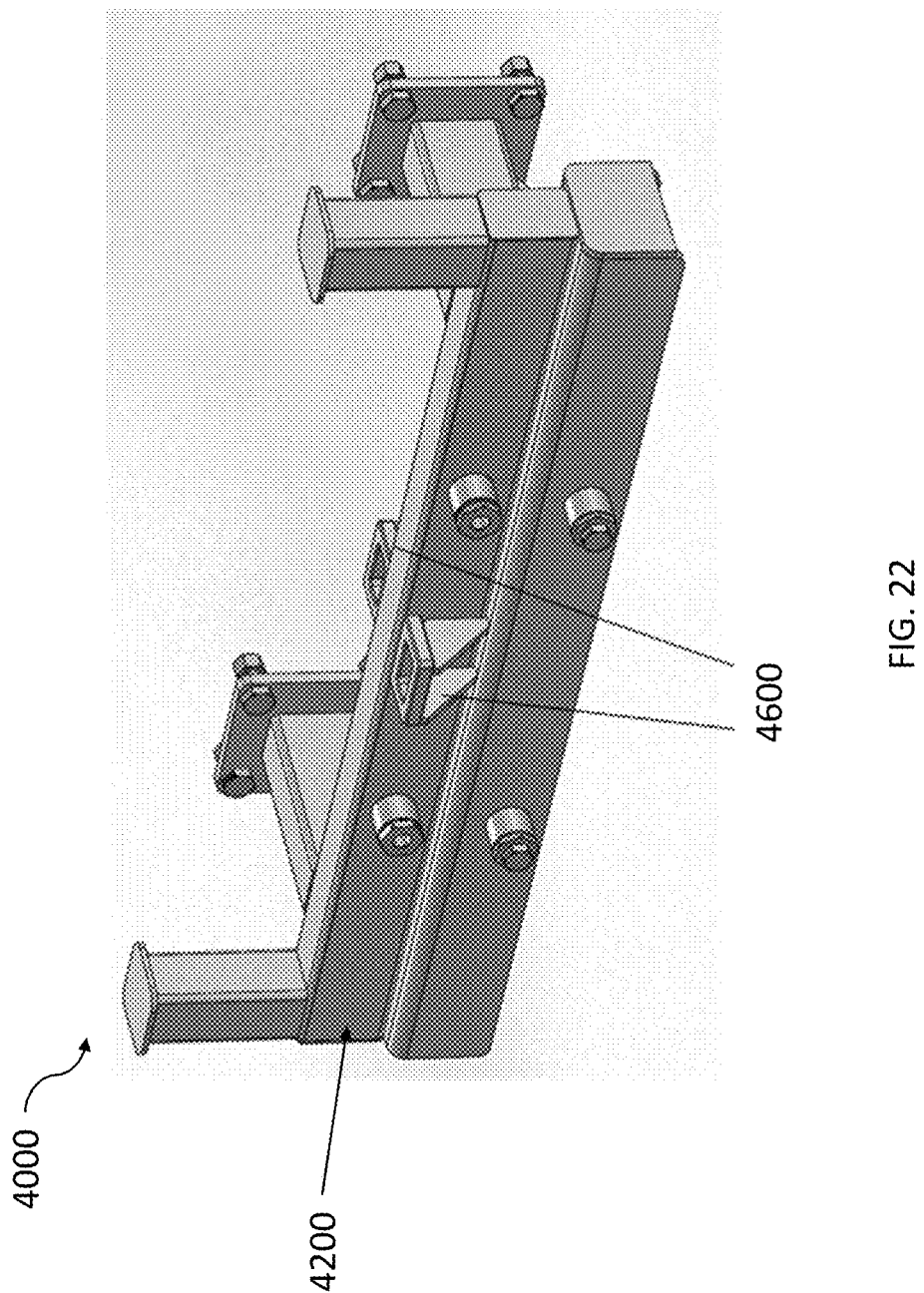
FIG. 22 depicts a perspective view of the root ring attachment of the embodiment shown in FIG. 11.
Figure 23:
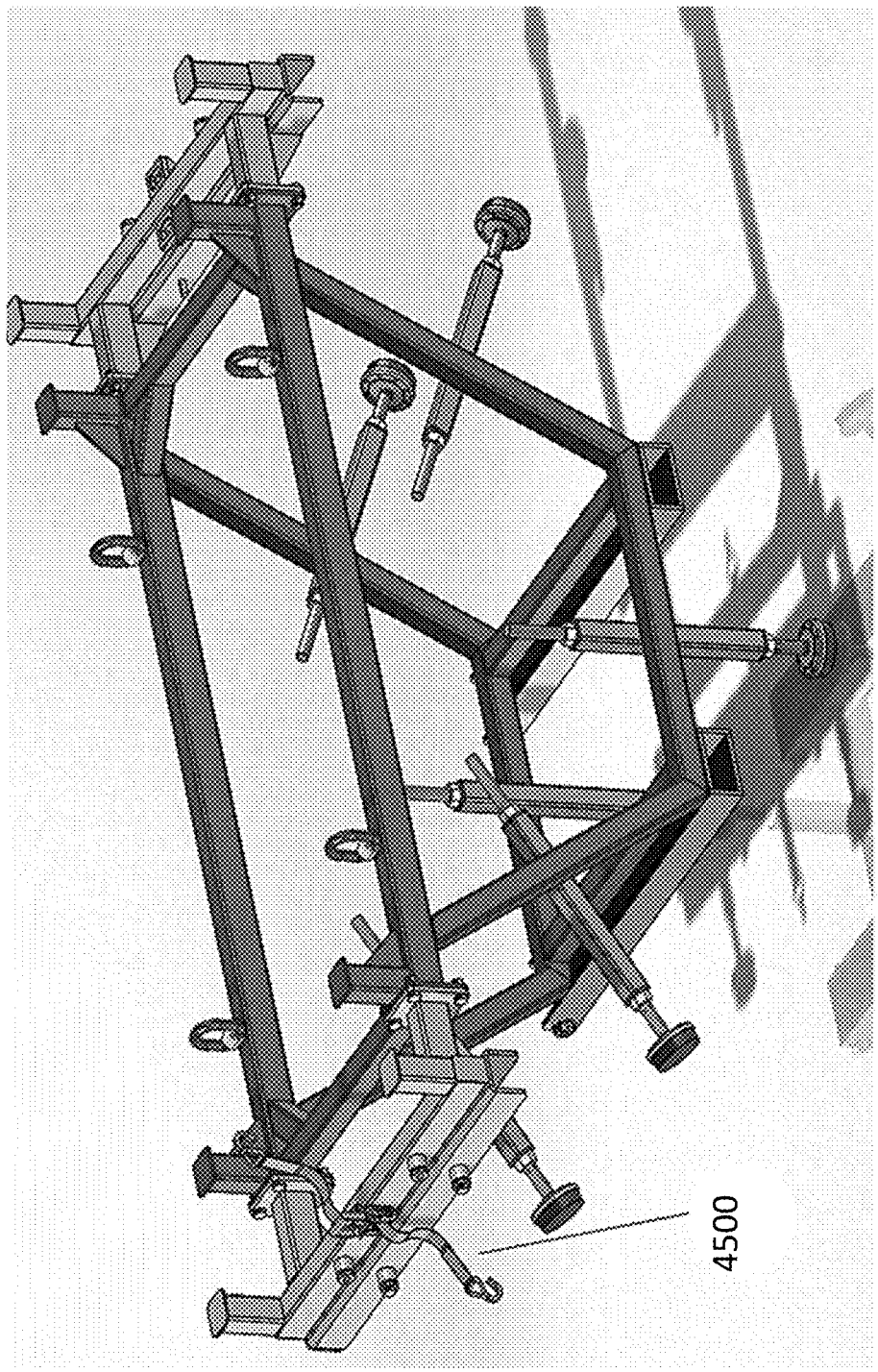
FIG. 23 depicts a perspective view of the root handling apparatus and root ring attachment of the embodiment shown in FIG. 11.
Figure 24:
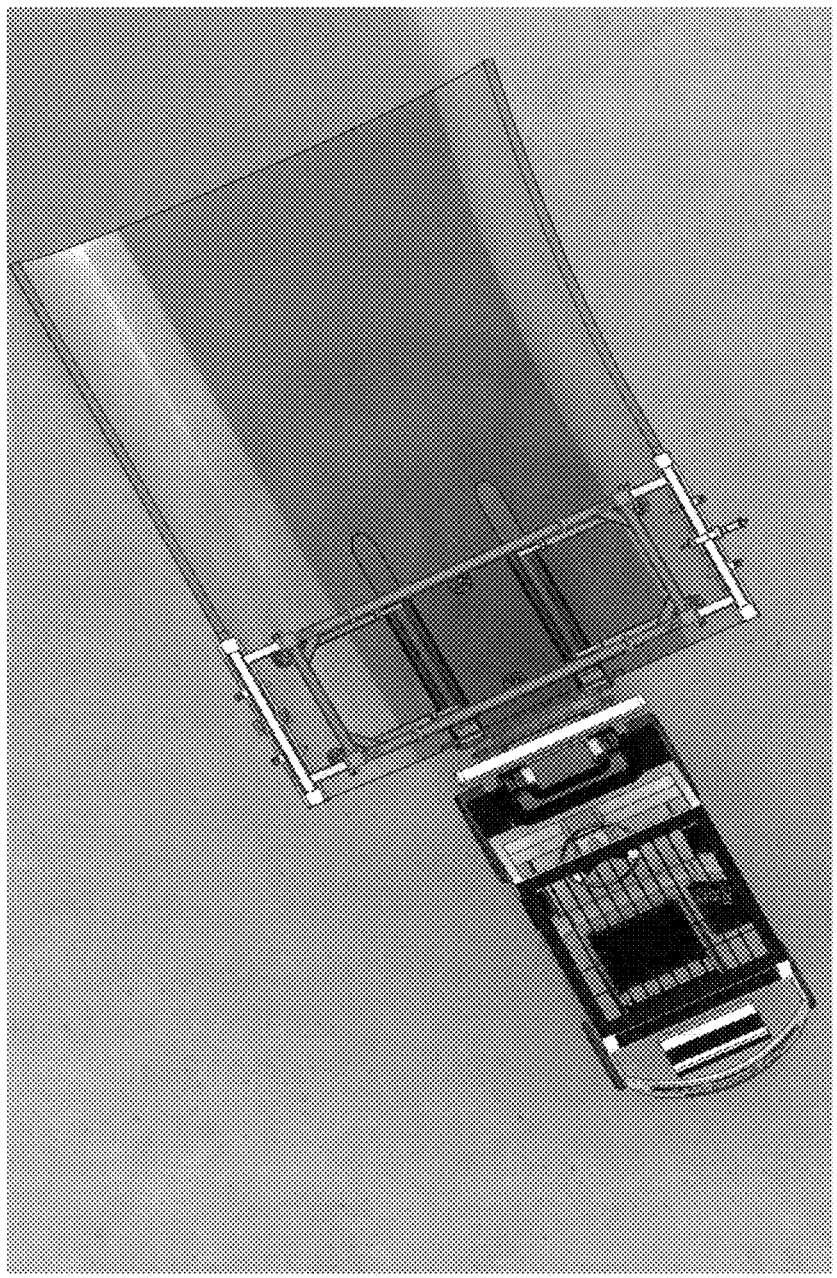
FIGS. 24-27 depict top, front-perspective, front and rear-perspective views of the root handling apparatus and root ring attachment of the embodiment shown in FIG. 11.
Figure 25:
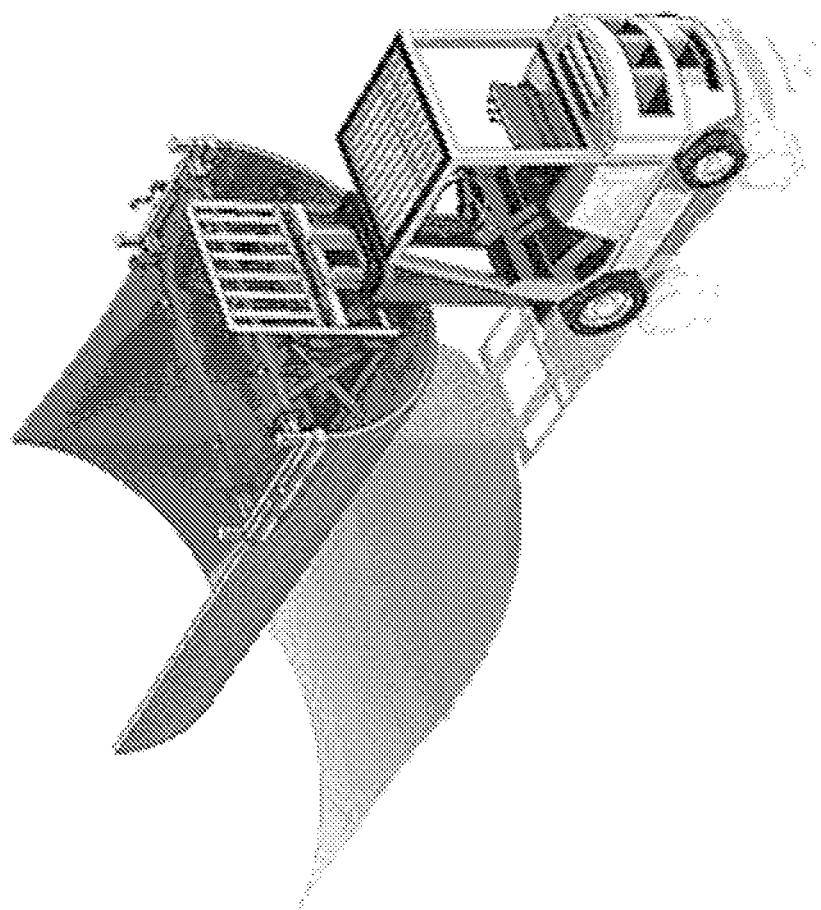
Figure 26:
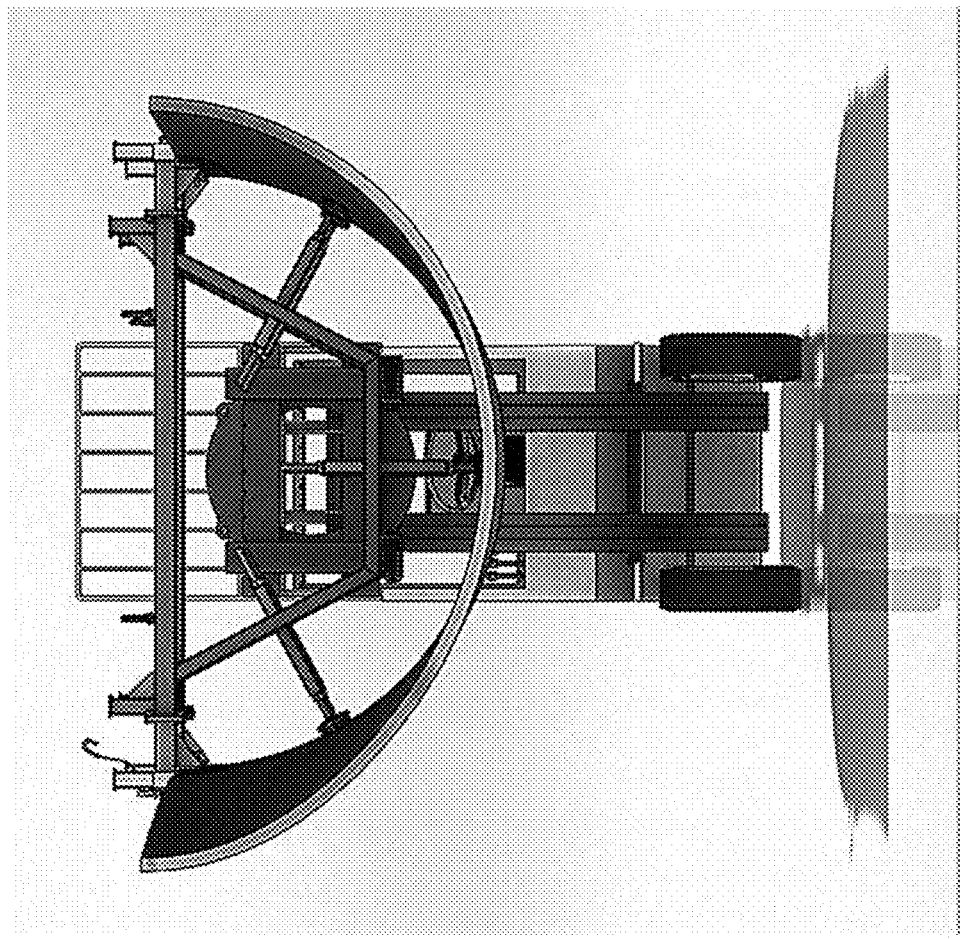
Figure 27:
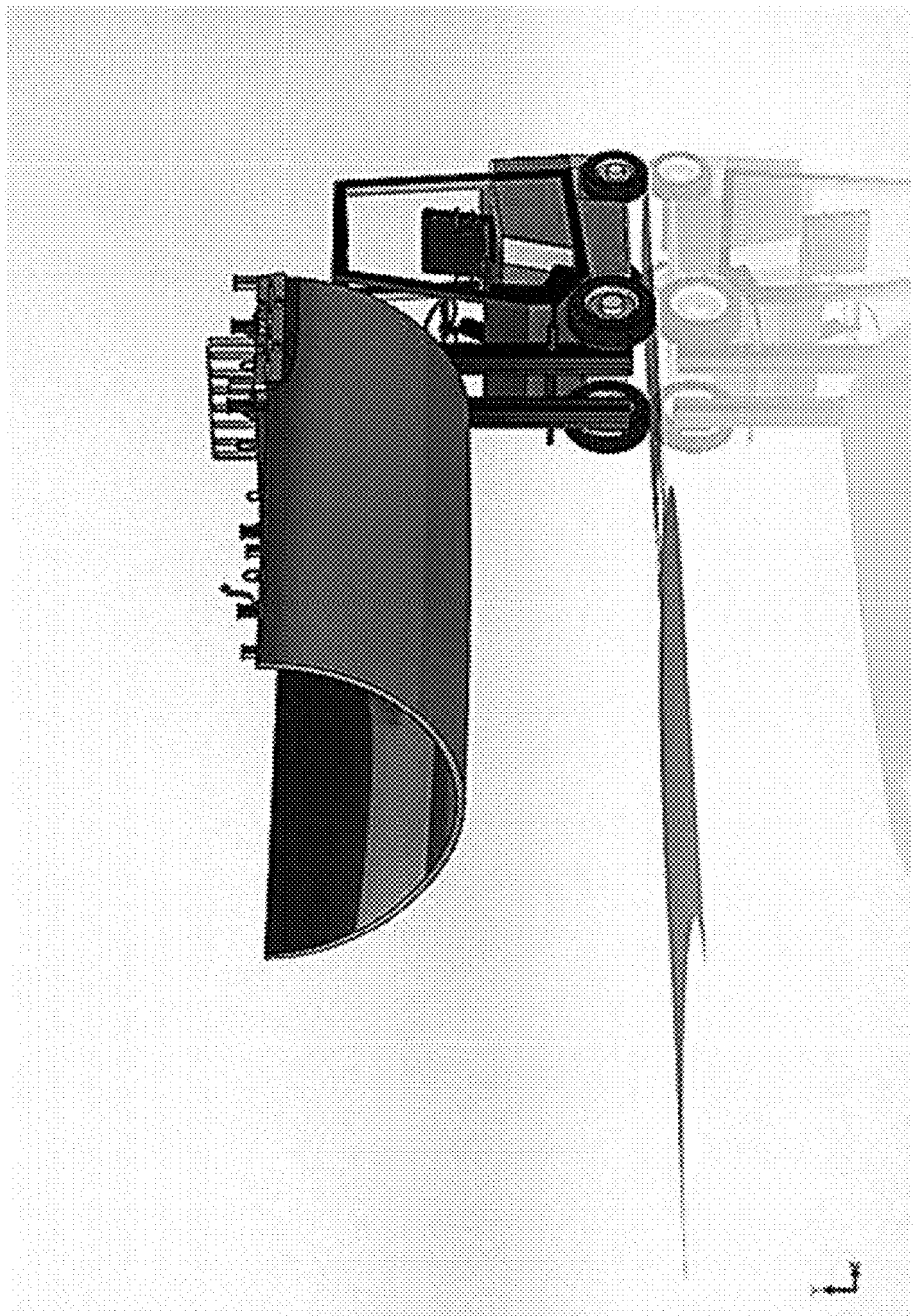

As shown in FIG. 20, the width (as shown by reference numeral 4) of the root ring attachment 400 can be adjusted to be greater than the width of the root ring 10, thereby making the root handling apparatus 2000, and root ring attachment 400, suitable for use in the root ring products of any size. Here, the root handling apparatus 2000 is positioned entirely within the root ring 10 diameter, and the root ring attachment 4000 connects to the root ring handling apparatus 2000 and extends beyond or outside the root ring 10. As shown the upper edge, or flange, of the root ring 10 is inserted into the channel defined by the sidewalls 4150 of the root ring attachment, and connecting pins 4370 are inserted through the root ring attachment and the root ring 10 to securely fasten the two components. (The root ring attachment is also attached to the root handling apparatus 2000 on the opposing, laterally inward, side). Tension rods 3000 engage the interior surface of the root ring to apply the desired amount of force, at the desired location and angle. Once securely fastened, the forklift can operate to lift the root ring 10 via the tines inserted within the forklift adaptor 1000, and rotate the root ring 10 via the swivel disc attachment 12.

Additionally, stretch slings 4500 can be attached, e.g. at the middle, of both root ring attachments 4400, and include a hook on a second end for attaching to the root ring attachment on the opposing side of the root ring. This allows another point of contact and transferring of the weight of the root ring. Thus, the force applied by the tension rods 3000 to the root ring 10 and the force applied by the slings 4500 to the root ring 10 has increased the ability to stabilize and balance the root ring 10. In operation, one of the slings 4500 (not shown to scale) is passed over the root handling apparatus 2000 through the hole 4600 of the root ring attachment 4000 at the opposite side. The other sling is passed under the root ring 10 and connected to the hole 4600 on the same apparatus. This use of this sling provides additional safety and stability, reducing risk of injury to technicians.

The components disclosed herein can be formed in a range of dimensions, and formed of any material (e.g. steel, aluminum, etc.) exhibiting sufficient rigidity to support the weight of the root ring.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A wind turbine blade handling system comprising:
   a forklift adaptor, the forklift adaptor including a base and an endwall, the base configured to engage at least one tine of a forklift;
   a root handling apparatus, the root handling apparatus including a plurality of struts;
   at least one tension rod, the at least one tension rod coupled to the at least one strut;
   wherein at least a portion of the root handling apparatus and at least one tension rod is configured to be disposed within a root ring and receive a spanwise portion of a flange of the root ring.

2. The wind turbine blade handling system of claim 1, wherein the root handling apparatus and root ring are coupled together.

3. The wind turbine blade handling system of claim 1, wherein the root handling apparatus and root ring are elevated together.

4. The wind turbine blade handling system of claim 1, wherein the root handling apparatus and root ring are rotated together.

5. The wind turbine blade handling system of claim 1, wherein the tension rod includes an actuator on a first end and a dampening shoe on a second end thereof.

6. The wind turbine blade handling system of claim 5, wherein the dampening shoe includes a shape complimentary to the shape of the root ring.

7. The wind turbine blade handling system of claim 1, wherein a plurality of tension rods are selectively actuatable to engage an interior surface of the root ring.

8. The wind turbine blade handling system of claim 1, wherein the at least one tension rod applies a force to the root ring.

9. The wind turbine blade handling system of claim 1, wherein the root handling apparatus and tension rod are separate components.

10. The wind turbine blade handling system of claim 1, wherein the root handling apparatus and root ring are rotatable 360 degrees about a longitudinal axis.

11. The wind turbine blade handling system of claim 1, wherein the root handling apparatus has a first end and a second end, at least one end having a length equal to or greater than a diameter of the root ring.

12. A method of handling a wind turbine blade comprising:
providing a forklift adaptor, the forklift adaptor including a base and an endwall,
coupling the base of the forklift adaptor to at least one tine of a forklift;
placing a root handling apparatus within a root ring of a wind turbine blade, the root handling apparatus including a plurality of struts and at least one tension rod, and
actuating the at least one tension rod to engage a surface of the root ring,
wherein the root handling apparatus receives a spanwise portion of a flange of the root ring.

13. The method of claim 12, further comprising coupling at least one side of the root handling apparatus to the root ring.

14. The method of claim 13, wherein coupling includes connecting a mechanical fastener between the root handling apparatus and the root ring.

15. The method of claim 12, further comprising elevating the root handling apparatus and root ring simultaneously.

16. The method of claim 15, wherein elevating includes attaching a cable to the root handling apparatus.

17. The method of claim 12, further comprising rotating the root handling apparatus and root ring simultaneously.

18. The method of claim 12, wherein actuating the at least one tension rod includes elongating the at least one tension rod to apply a tensile force on the root ring.

19. The method of claim 18, wherein the at least one tension rod includes a plurality of tension rods, with each tension rod actuated independently.

20. The method of claim 19, wherein at least two tension rods are elongated to different lengths.

* * * * *